(12) United States Patent
Luong

(10) Patent No.: US 9,699,784 B2
(45) Date of Patent: Jul. 4, 2017

(54) SYSTEMS AND METHODS FOR ESTABLISHING WIRELESS COMMUNICATIONS BETWEEN WIRELESS CIRCUITRY AND MULTIPLE BASE STATIONS

(71) Applicant: Apple Inc., Cupertino, CA (US)

(72) Inventor: Anh Q. Luong, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 83 days.

(21) Appl. No.: 14/724,734

(22) Filed: May 28, 2015

(65) Prior Publication Data
US 2015/0365946 A1 Dec. 17, 2015

Related U.S. Application Data

(60) Provisional application No. 62/012,227, filed on Jun. 13, 2014.

(51) Int. Cl.
*H04W 72/04* (2009.01)
*H04W 76/02* (2009.01)
(Continued)

(52) U.S. Cl.
CPC ....... *H04W 72/0453* (2013.01); *H04L 1/0003* (2013.01); *H04W 76/025* (2013.01); *H04W 88/08* (2013.01); *H04W 72/0426* (2013.01)

(58) Field of Classification Search
CPC ... H04W 84/02; H04W 84/04; H04W 84/045; H04W 84/12; H04W 92/10; H04W 92/20;
(Continued)

(56) References Cited

U.S. PATENT DOCUMENTS

| 7,089,009 B1* | 8/2006 | Fauconnier ....... H04W 36/0055 370/352 |
| 7,653,393 B2* | 1/2010 | Kim ................. H04W 36/0061 370/331 |

(Continued)

FOREIGN PATENT DOCUMENTS

WO 2013117009 8/2013

*Primary Examiner* — Alpus H Hsu
(74) *Attorney, Agent, or Firm* — Treyz Law Group, P.C.; Michael H. Lyons

(57) ABSTRACT

An electronic device has wireless communications circuitry. The wireless circuitry may transmit and receive wireless signals over a network having first and second wireless base stations. The first base station may establish a primary wireless connection with the device using selected connection settings and may transmit the selected connection settings to the second base station. The second base station may copy the received connection settings to establish a secondary wireless connection with the device while the primary connection is simultaneously maintained. After the primary and secondary connections have been established, the first and second base stations may transmit data streams to the electronic device over different frequency bands in a carrier aggregation link. By using the second base station to copy the received connection settings that were used by the first base station to establish the primary connection, the connection time for establishing the carrier aggregation link may be improved.

21 Claims, 12 Drawing Sheets

US 9,699,784 B2
Page 2

(51) Int. Cl.
   *H04L 1/00* (2006.01)
   *H04W 88/08* (2009.01)

(58) Field of Classification Search
   CPC ............... H04L 1/0003; H04L 27/0008; H04L 27/0012; H04L 27/2601; H04L 27/2697; H04L 27/28; H04L 27/30; H04L 29/06
   See application file for complete search history.

(56) References Cited

U.S. PATENT DOCUMENTS

| | | | | |
|---|---|---|---|---|
| 8,570,910 B2* | 10/2013 | Iwai | ...................... | H04L 5/0044 |
| | | | | 370/208 |
| 8,600,426 B2* | 12/2013 | Gaal | ...................... | H04W 52/44 |
| | | | | 455/522 |
| 8,639,239 B2* | 1/2014 | Uemura | ................ | H04W 24/08 |
| | | | | 455/423 |
| 8,755,346 B2* | 6/2014 | Ohta | ................. | H04W 72/0473 |
| | | | | 370/329 |
| 8,861,413 B2* | 10/2014 | Immonen | ............ | H04W 52/367 |
| | | | | 370/311 |
| 8,874,114 B2 | 10/2014 | Suemitsu et al. | | |
| 9,113,422 B2* | 8/2015 | Jeong | ................... | H04W 52/146 |
| 9,137,804 B2* | 9/2015 | Lin | ..................... | H04W 72/048 |
| 9,154,215 B2* | 10/2015 | Noh | ....................... | H04B 7/155 |
| 9,258,833 B2* | 2/2016 | Bitran | .................. | H04W 16/14 |
| 9,264,205 B2* | 2/2016 | Celebi | .................. | H04L 5/0085 |
| 9,331,823 B2* | 5/2016 | Wang | ........................ | H04L 5/00 |
| 9,363,782 B2* | 6/2016 | Tenny | ................... | H04W 64/00 |
| 2003/0114114 A1* | 6/2003 | Itoh | ...................... | H04B 7/2684 |
| | | | | 455/69 |
| 2005/0286408 A1* | 12/2005 | Jin | ........................ | H04L 5/0048 |
| | | | | 370/208 |
| 2011/0096752 A1 | 4/2011 | Yuk et al. | | |
| 2011/0103309 A1 | 5/2011 | Wang et al. | | |
| 2012/0183093 A1 | 7/2012 | Zhu | | |
| 2014/0177555 A1* | 6/2014 | Ng | .................... | H04W 72/0406 |
| | | | | 370/329 |
| 2014/0242946 A1 | 8/2014 | Wu | | |
| 2014/0256338 A1 | 9/2014 | Xu et al. | | |
| 2014/0362777 A1 | 12/2014 | Panchal et al. | | |
| 2015/0245302 A1* | 8/2015 | Lim | ...................... | H04W 52/34 |
| | | | | 455/522 |
| 2015/0289237 A1* | 10/2015 | Kim | ....................... | H04L 27/26 |
| | | | | 370/329 |

\* cited by examiner

| CONNECTION SETTING | VALUE |
| --- | --- |
| NUMBER OF UPLINK RESOURCE BLOCKS | 25 |
| STARTING UPLINK RESOURCE BLOCK | 0 |
| UPLINK MODULATION SCHEME | QPSK |
| UPLINK DATA RATE | A |
| UPLINK POWER LEVEL | B |
| UPLINK PATHLOSS COMPENSATION | E |
| UPLINK SIGNAL BANDWIDTH | F |
| ⋮ | ⋮ |
| NUMBER OF DOWNLINK RESOURCE BLOCKS | 25 |
| STARTING DOWNLINK RESOURCE BLOCK | 0 |
| DOWNLINK MODULATION SCHEME | QPSK |
| DOWNLINK DATA RATE | A |
| DOWNLINK POWER LEVEL | C |
| DOWNLINK POWER OFFSET | D |
| DOWNLINK SIGNAL BANDWIDTH | F |
| ⋮ | ⋮ |

*FIG. 12*

SYSTEMS AND METHODS FOR ESTABLISHING WIRELESS COMMUNICATIONS BETWEEN WIRELESS CIRCUITRY AND MULTIPLE BASE STATIONS

This application claims the benefit of provisional patent application No. 62/012,227 filed Jun. 13, 2014, which is hereby incorporated by reference herein in its entirety.

BACKGROUND

This relates generally to wireless communications circuitry, and more particularly, to circuitry in wireless electronic devices that simultaneously receives radio-frequency transmissions in different frequency bands.

Electronic devices such as computers and cellular telephones are often provided with wireless communications capabilities. For example, electronic devices may use long-range wireless communications circuitry such as cellular telephone circuitry. Global Positioning System (GPS) receiver circuitry and other satellite receiver circuitry may be used to receive satellite navigation signals. Local wireless links may be used to support local area network communications such as IEEE 802.11 communications at 2.4 GHz and 5 GHz. Local links may also be used to handle Bluetooth® communications at 2.4 GHz.

It is often desirable for a device to support multiple bands. For example, users of a cellular telephone may desire to communicate with cellular base stations using one or more different cellular telephone bands and may desire to communicate with local area network equipment using wireless local area network (WLAN) communications bands.

In conventional electronic devices with wireless communications circuitry, the wireless communications circuitry is typically configured to convey radio-frequency signals over a selected communications band with a single wireless base station. The wireless communications circuitry includes filtering circuitry and switching circuitry for transmitting and receiving wireless signals in the selected communications band. The filtering and switching circuitry is adjustable to switch to a different band for transmitting and receiving wireless signals. Using a single communications band for transmitting and receiving wireless signals often limits the bandwidth and data throughput that is obtainable by the wireless communications circuitry. Using a single wireless base station to perform wireless communications operations can limit the data throughput that is obtainable by the wireless communications circuitry when the associated electronic device moves to locations at greater distances from the base station.

It would therefore be desirable to be able provide systems and methods for transmitting and receiving wireless signals over multiple communications bands between a wireless device and multiple wireless base stations.

SUMMARY

An electronic device may be provided with wireless communications circuitry. The wireless communications circuitry may include radio-frequency transceiver circuitry for handling wireless communications. The radio-frequency transceiver may have multiple transmitters and multiple receivers. Antenna structures may be used to transmit and receive signals.

The antenna structures may be coupled to transmitters and receivers in the radio-frequency transceiver circuitry. Switching circuitry such as first and second radio-frequency switch stages may be used to support multiple communications bands of interest. The first and second radio-frequency switch stages may be configured in real time to switch desired frequencies into use. The wireless communications circuitry may handle radio-frequency signals that are simultaneously received and/or transmitted in multiple frequency bands. For example, the wireless communications circuitry may handle data streams that are simultaneously received from multiple wireless base stations (e.g., using a carrier aggregation scheme), allowing for the wireless communications circuitry to have improved data throughput relative to devices that receive signals only over a single frequency band.

The electronic device may transmit and receive wireless signals with a wireless system having multiple wireless base stations. The wireless base stations and the electronic device may handle radio-frequency signals using a Long-Term-Evolution (LTE) protocol. The first wireless base station may establish a first wireless connection between the first wireless base station and the electronic device using a set of wireless connection settings (e.g., using selected power levels, a selected modulation scheme, a selected LTE resource block allocation, a selected bandwidth, throughput, etc.). The first wireless base station may transmit the set of wireless connection settings used for establishing the first wireless connection to the second wireless base station.

The second wireless base station may establishing a second wireless connection between the second base station and the electronic device using some or all of the wireless connection settings included in the set of wireless connection settings received from the first wireless base station. For example, the second base station may copy (clone) one or more of the received wireless connection settings for use in establishing the second wireless connection. The second wireless connection may be established while the first base station simultaneously maintains the first wireless connection with the electronic device (e.g., without dropping the first wireless connection). After the first and second connections have been established, the first and second wireless base stations may simultaneously transmit first and second data streams to the electronic device over respective frequency bands (e.g., over respective LTE bands using a carrier aggregation scheme or link). By copying wireless connection settings that were successfully used by the first base station to establish the first wireless connection, the carrier aggregation link (connection) between the electronic device and the first and second base stations over the first and second frequency bands may require less time to set up than systems that cycle through possible connection settings for each base station (e.g., connection time required to establish the carrier aggregation link between the electronic device and multiple base stations may be improved).

The first base station may include storage circuitry and may store neighboring base station information and/or device information associated with the electronic device on the storage circuitry. The neighboring base station information may identify the second wireless base station and the frequency band in use by the second wireless base station. The first base station may transmit some or all of the neighboring base station information to the electronic device over the first frequency band. The electronic device may identify a first wireless coverage area associated with the first base station and may identify a second wireless coverage area associated with the second base station in the received neighboring base station information. The electronic device may determine whether the electronic device is located within an overlap region between the first two coverage regions and may transmit a request to establish the second connection over the second frequency band in response to determining that the electronic device is within the overlap region. The first base station may receive device identification information from the electronic device over the first frequency band and may transmit the information to the second base station.

The second base station may receive a request to establish the second wireless connection over the second frequency band and may retrieve additional device identification information from the electronic device over the second frequency band in response to receiving the request to establish the second wireless connection. The second base station may determine whether to establish the second wireless connection between the second base station and the electronic device by comparing the device identification information received from the first base station to the additional device identification information received from the electronic device. For example, the second base station may establish the second wireless connection in response to determining that the device identification information received form the first base station matches the additional device identification information received from the electronic device (e.g., to ensure that the second wireless connection is not established with an independent wireless device that is not attempting to connect to both of the first and second base stations).

Further features of the invention, its nature and various advantages will be more apparent from the accompanying drawings and the following detailed description of the preferred embodiments.

BRIEF DESCRIPTION OF THE DRAWINGS

FIG. 12 is an illustrative diagram of connection settings that may be used to successfully establish a wireless connection between a wireless device and a first wireless base station and that may be cloned at a second wireless base station to establish a second simultaneous wireless connection between the wireless device and the second wireless base station in accordance with an embodiment of the present invention.

DETAILED DESCRIPTION

Figure 1:
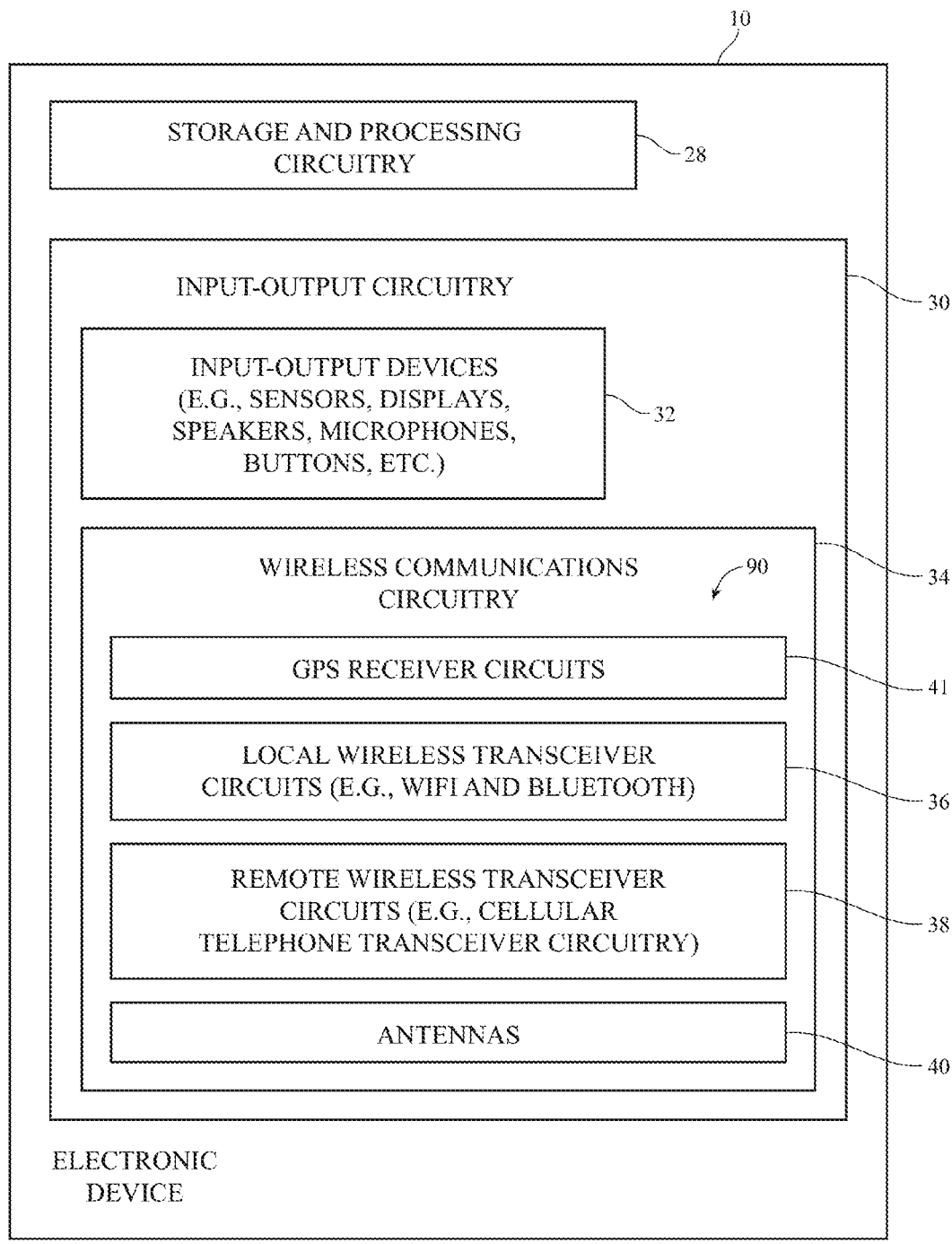
FIG. 1 is a schematic diagram of an illustrative electronic device with wireless communications circuitry in accordance with an embodiment of the present invention.

Electronic devices such as device 10 of FIG. 1 may be provided with wireless communications circuitry. The wireless communications circuitry may be used to support long-range wireless communications such as communications in cellular telephone bands. Examples of long-range (cellular telephone) bands that may be handled by device 10 include the 800 MHz band, the 850 MHz band, the 900 MHz band, the 1800 MHz band, the 1900 MHz band, the 2100 MHz band, the 700 MHz band, and other bands. The long-range bands used by device 10 may include the so-called LTE (Long Term Evolution) bands. The LTE bands are numbered (e.g., 1, 2, 3, etc.) and are sometimes referred to as E-UTRA operating bands. Long-range signals such as signals associated with satellite navigation bands may be received by the wireless communications circuitry of device 10. For example, device 10 may use wireless circuitry to receive signals in the 1575 MHz band associated with Global Positioning System (GPS) communications. Short-range wireless communications may also be supported by the wireless circuitry of device 10. For example, device 10 may include wireless circuitry for handling local area network links such as WiFi® links at 2.4 GHz and 5 GHz, Bluetooth® links at 2.4 GHz, etc.

As shown in FIG. 1, device 10 may include storage and processing circuitry 28. Storage and processing circuitry 28 may include storage such as hard disk drive storage, non-volatile memory (e.g., flash memory or other electrically-programmable-read-only memory configured to form a solid state drive), volatile memory (e.g., static or dynamic random-access-memory), etc. Processing circuitry in storage and processing circuitry 28 may be used to control the operation of device 10. This processing circuitry may be based on one or more microprocessors, microcontrollers, digital signal processors, application specific integrated circuits, etc.

Storage and processing circuitry 28 may be used to run software on device 10, such as internet browsing applications, voice-over-internet-protocol (VOIP) telephone call applications, email applications, media playback applications, operating system functions, functions related to communications band selection during radio-frequency transmission and reception operations, etc. To support interactions with external equipment, storage and processing circuitry 28 may be used in implementing communications protocols. Communications protocols that may be implemented using storage and processing circuitry 28 include internet protocols, wireless local area network protocols (e.g., IEEE 802.11 protocols—sometimes referred to as WiFi®), protocols for other short-range wireless communications links such as the Bluetooth® protocol, cellular telephone protocols, MIMO (multiple input multiple output) protocols, antenna diversity protocols, etc. Wireless communications operations such as communications band selection operations may be controlled using software stored and running on device 10 (i.e., stored and running on storage and processing circuitry 28 and/or input-output circuitry 30).

Input-output circuitry 30 may include input-output devices 32. Input-output devices 32 may be used to allow data to be supplied to device 10 and to allow data to be provided from device 10 to external devices. Input-output devices 32 may include user interface devices, data port devices, and other input-output components. For example, input-output devices may include touch screens, displays without touch sensor capabilities, buttons, joysticks, click wheels, scrolling wheels, touch pads, key pads, keyboards, microphones, cameras, buttons, speakers, status indicators, light sources, audio jacks and other audio port components, digital data port devices, light sensors, motion sensors (accelerometers), capacitance sensors, proximity sensors, etc.

Input-output circuitry 30 may include wireless communications circuitry 34 for communicating wirelessly with external equipment. Wireless communications circuitry 34 may include radio-frequency (RF) transceiver circuitry formed from one or more integrated circuits, power amplifier circuitry, low-noise input amplifiers, passive RF components, one or more antennas, transmission lines, and other circuitry for handling RF wireless signals. Wireless signals can also be sent using light (e.g., using infrared communications).

Wireless communications circuitry 34 may include radio-frequency transceiver circuitry 90 for handling various radio-frequency communications bands. For example, circuitry 34 may include transceiver circuitry 36, 38, and 41. Transceiver circuitry 36 may handle 2.4 GHz and 5 GHz bands for WiFi® (IEEE 802.11) communications and may handle the 2.4 GHz Bluetooth® communications band. Circuitry 34 may use cellular telephone transceiver circuitry 38 for handling wireless communications in cellular telephone bands such as at 850 MHz, 900 MHz, 1800 MHz, 1900 MHz, and 2100 MHz and/or the LTE bands and other bands (as examples). Circuitry 38 may handle voice data and non-voice data.

Wireless communications circuitry 34 may include global positioning system (GPS) receiver equipment such as GPS receiver circuitry 41 for receiving GPS signals at 1575 MHz or for handling other satellite positioning data such as Global Navigation Satellite System (GLONASS) data. In WiFi® and Bluetooth® links and other short-range wireless links, wireless signals are typically used to convey data over tens or hundreds of feet. In cellular telephone links and other long-range links, wireless signals are typically used to convey data over thousands of feet or miles.

Wireless communications circuitry 34 may include one or more antennas 40. Antennas 40 may be formed using any suitable antenna types. For example, antennas 40 may include antennas with resonating elements that are formed from loop antenna structure, patch antenna structures, inverted-F antenna structures, slot antenna structures, planar inverted-F antenna structures, helical antenna structures, hybrids of these designs, etc. Different types of antennas may be used for different bands and combinations of bands. For example, one type of antenna may be used in forming a local wireless link antenna and another type of antenna may be used in forming a remote wireless link antenna.

Antenna diversity schemes may be implemented in which multiple redundant antennas are used in handling communications for a particular band or bands. In an antenna diversity scheme, storage and processing circuitry 28 may select which antenna to use in real time based on signal strength measurements or other data. In multiple-input-multiple-output (MIMO) schemes, multiple antennas may be used to transmit and receive multiple data streams, thereby enhancing data throughput.

Figure 2:
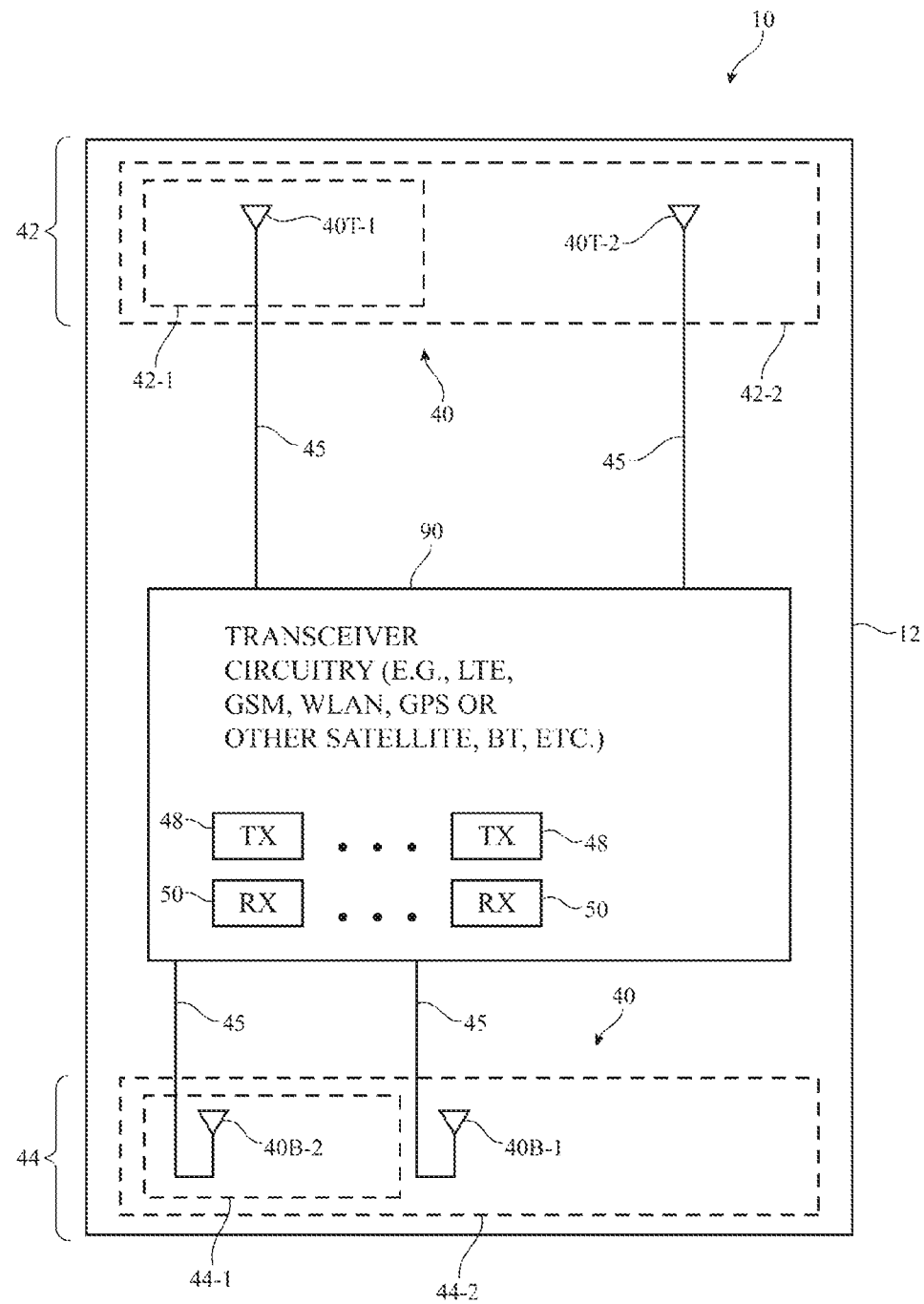
FIG. 2 is a diagram showing how radio-frequency transceiver circuitry may be coupled to one or more antennas within an electronic device of the type shown in FIG. 1 in accordance with an embodiment of the present invention.

Illustrative locations in which antennas 40 may be formed in device 10 are shown in FIG. 2. As shown in FIG. 2, electronic device 10 may have a housing such as housing 12. Housing 12 may include plastic walls, metal housing structures, structures formed from carbon-fiber materials or other composites, glass, ceramics, or other suitable materials. Housing 12 may be formed using a single piece of material (e.g., using a unibody configuration) or may be formed from a frame, housing walls, and other individual parts that are assembled to form a completed housing structure. The components of device 10 that are shown in FIG. 1 may be mounted within housing 12. Antenna structures 40 may be mounted within housing 12 and may, if desired, be formed using parts of housing 12 (e.g., parts of housing 12 may be used in forming antenna resonating element structures for antennas 40, ground plane structures for antennas 40, etc.). For example, housing 12 may include metal housing sidewalls, peripheral conductive members such as band-shaped members (with or without dielectric gaps) that extend along the periphery of device 10 (e.g., along exterior surfaces of device 10), conductive bezels, and other conductive structures that may be used in forming antenna structures 40.

As shown in FIG. 2, antenna structures 40 may be coupled to transceiver circuitry 90 by paths such as paths 45. Paths 45 may include transmission line structures such as coaxial cables, microstrip transmission lines, stripline transmission lines, etc. Paths 45 may also radio-frequency front end circuitry such as impedance matching circuitry, filter circuitry, and switching circuitry. Impedance matching circuitry may be used to ensure that antennas 40 are efficiently coupled to transceiver circuitry 90 in communications bands of interest. Filter circuitry may be used to implement frequency-based multiplexing circuits such as diplexers, duplexers, and triplexers. Switching circuitry may be used to selectively couple antennas 40 to desired ports of transceiver circuitry 90. For example, in one operating mode a switch may be configured to route one of paths 45 to a given antenna and in another operating mode the switch may be configured to route a different one of paths 45 to the given antenna. The use of switching circuitry between transceiver circuitry 90 and antennas 40 allows device 10 to support multiple communications bands of interest with a limited number of antennas.

In a device such as a cellular telephone that has an elongated rectangular outline, it may be desirable to place antennas 40 at one or both ends of the device. As shown in FIG. 2, for example, some of antennas 40 may be placed in upper end region 42 of housing 12 and some of antennas 40 may be placed in lower end region 44 of housing 12. The antenna structures in device 10 may include a single antenna in region 42, a single antenna in region 44, multiple antennas in region 42, multiple antennas in region 44, or may include one or more antennas located elsewhere in housing 12.

Antenna structures 40 may be formed within some or all of regions such as regions 42 and 44. For example, an antenna such as antenna 40T-1 may be located within region 42-1 or an antenna such as antenna 40T-2 may be formed that fills some or all of region 42-1. An antenna such as antenna 40B-1 may fill some or all of region 44-2 or an antenna such as antenna 40B-2 may be formed in region 44-1. These types of arrangements need not be mutually exclusive. For example, region 44 may contain a first antenna such as antenna 40B-1 and a second antenna such as antenna 40B-2.

Transceiver circuitry 90 may contain transmitters such as transmitters 48 and receivers such as receivers 50. Transmitters 48 and receivers 50 may be implemented using one or more integrated circuits (e.g., cellular telephone communications circuits, wireless local area network communications circuits, circuits for Bluetooth® communications, circuits for receiving satellite navigation system signals, power amplifier circuits for increasing transmitted signal power, low noise amplifier circuits for increasing signal power in received signals, other suitable wireless communications circuits, and combinations of these circuits).

Device 10 may be a relatively large device (e.g. the lateral dimensions of housing 12 may be tens of centimeters or larger) or may be a relatively compact device such as a handheld device that has a longitudinal dimension along the main axis of housing 12 that is 15 cm or less, 10 cm or less, or 5 cm or less, and that has smaller transverse dimensions. In miniature devices such as wrist-mounted, pendant, and clip-mounted devices, the dimensions of housing 12 may be 10 cm or less or 5 cm or less (as examples).

Figure 3:
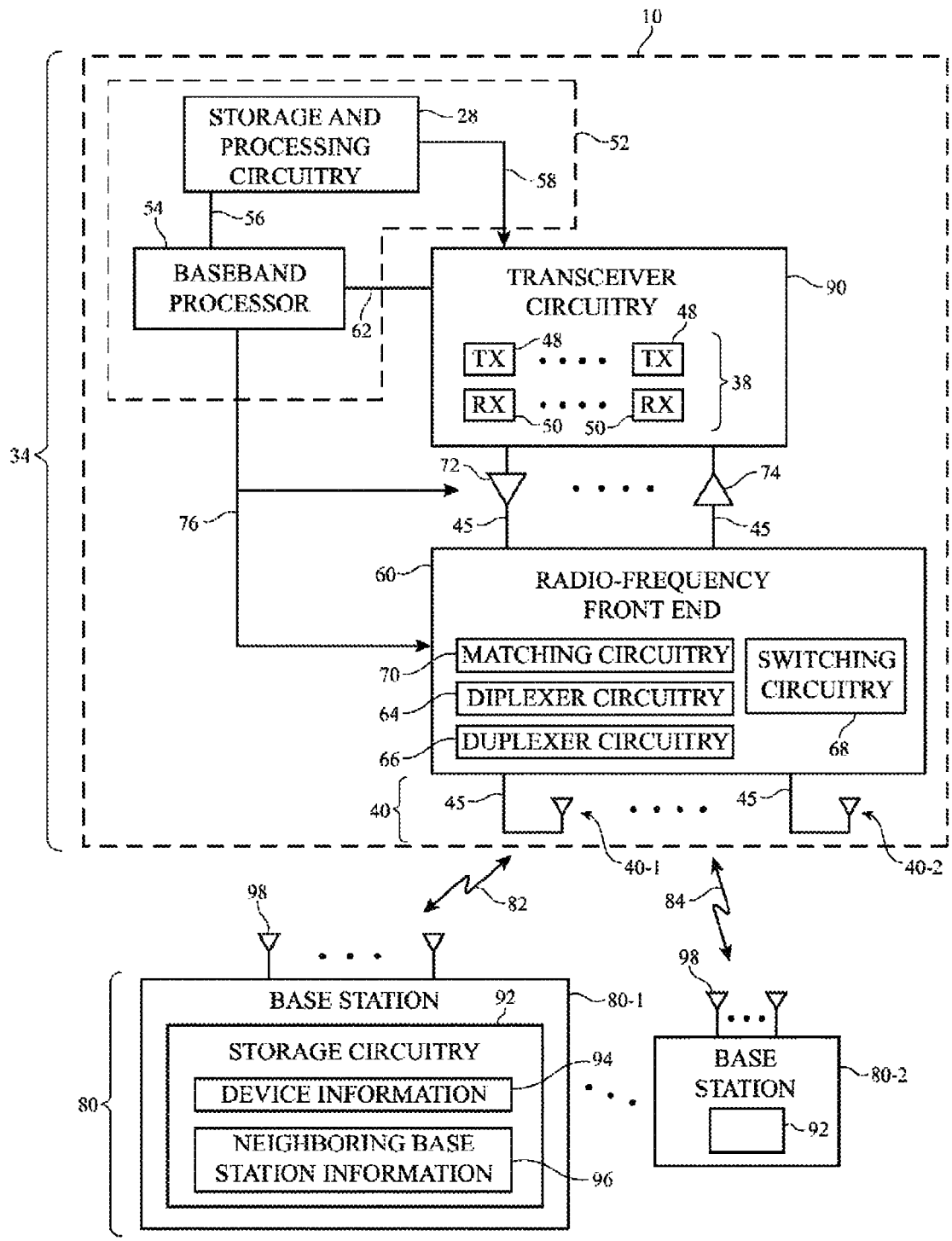
FIG. 3 is a diagram of illustrative wireless circuitry including multiple antennas and circuitry for controlling use of the antennas in real time to simultaneously convey radio-frequency signals in multiple frequency bands to multiple wireless base stations in accordance with an embodiment of the present invention.

Device 10 can be controlled by control circuitry that is configured to store and execute control code for implementing control algorithms (e.g., antenna diversity control algorithms and other wireless control algorithms). As shown in FIG. 3, control circuitry 52 may include storage and processing circuitry 28 (e.g., a microprocessor, memory circuits, etc.) and may include baseband processor 54. Baseband processor 54 may form part of wireless circuitry 34 and may include memory and processing circuits (i.e., baseband processor 54 may be considered to form part of the storage and processing circuitry of device 10).

Baseband processor 54 may provide data to storage and processing circuitry 28 via path 56. The data on path 56 may include raw data and processed data associated with wireless (antenna) performance metrics such as received power, transmitted power, frame error rate, bit error rate, signal-to-noise ratio, information on whether responses are being received from a cellular telephone tower corresponding to requests from the electronic device, information on whether a network access procedure has succeeded, information on how many re-transmissions are being requested over a cellular link between the electronic device and a cellular tower, information on whether a loss of signaling message has been received, and other information that is reflective of the performance of wireless circuitry 34. This information may be gathered for multiple antennas in real time using multiple active transceiver ports or using a time-division multiplexing scheme in which an alternate antenna(s) is momentarily used to evaluate its performance. Information on antenna performance metrics that has been gathered can be processed by storage and processing circuitry 28 and/or processor 54. Performance metric information may, for example, be used by communications circuitry 34 to determine whether a successful connection with external wireless communication equipment has been established. If desired, storage and processing circuitry 28 may control baseband processor 54 and transceiver circuitry 90 by providing control signals over paths 56 and 58. As an example, storage and processing circuitry 28 may issue control commands to baseband processor 54 and/or transceiver circuitry 90 in response determining that predetermined performance criteria have been satisfied.

Wireless circuitry 34 may include radio-frequency front end circuitry 60 interposed on paths 45 between transceiver circuitry 90 and antennas 40. Power amplifier circuitry such as amplifier 72 may be interposed on paths 45 between transmitters 48 and front end circuitry 60 for amplifying signals transmitted by transmitters 48. Low noise amplifier circuitry such as amplifier 74 may be interposed on paths 45 between receivers 50 and front end circuitry 60 for amplifying signals received over antennas 40. Control circuitry 52 may provide control signals to amplifiers 72 and 74 over path 76 to adjust amplifiers 72 and 74 (e.g., to adjust the gain provided by amplifiers 72 and 74). For example, control circuitry 52 may provide a desired bias voltage to power amplifiers 72 so that signals transmitted by transmitters 48 are provided at a desired uplink power level for transmission over antennas 40. Radio-frequency front end circuitry 60 may include switches such as switching circuitry 68, impedance matching circuitry such as matching circuitry 70, filtering circuitry such as diplexer circuitry 64 and duplexer circuitry 66, radio-frequency coupling circuitry, connector circuitry, and any other desired radio-frequency circuitry.

Baseband processor 54 may receive digital data that is to be transmitted using wireless circuitry 34 and may use path 62 and transceiver circuitry 90 (e.g., one or more transmitters 48 in transceiver circuitry 90) to transmit corresponding radio-frequency signals on one or more paths 45. Radio-frequency front end 60 may be used to transmit the radio-frequency signals. Incoming radio-frequency signals that are received by antennas 40 may be provided to baseband processor 54 via radio-frequency front end 60, paths such as one or more paths 45, amplifier circuitry 74, receiver circuitry in radio-frequency transceiver 90 such as one or more receivers 50, and paths such as path 62. If desired, individual antennas 40 (e.g., a first antenna 40-1, a second antenna 40-2, etc.) may provide received radio-frequency signals to a single corresponding receiver 50, individual antennas 40 may provide received radio-frequency signals to different receivers 50 (e.g., different receivers for handling received signals at different frequencies or in different frequency bands), multiple antennas 40 may provide received radio-frequency signals to a single receiver 50, etc.

Due to the close proximity of the antennas within device 10 in at least some device configurations, there may be a potential for interference between communication bands. This potential for interference may be exacerbated by the presence of the circuitry in paths 45, which may generate undesirable frequency harmonics. For example, switches in paths 45 may have non-linear properties that lead to the generation of second harmonics, third harmonics, and higher-order harmonics when passing radio-frequency signals.

Device 10 can reduce or undesirable interference between generated harmonics and signals received by antennas 40 by including filtering circuitry in paths 45 that blocks harmonics associated with transmitted signals before they reach antennas 40. Because the magnitude of transmitted harmonics is substantially reduced, the magnitude of any harmonics that are received by other antenna and receiver circuitry in device 10 is substantially reduced. By effectively preventing harmonics from being transmitted, the potential for signal interference is eliminated and satisfactory device operation is ensured.

If desired, antennas such as antennas 40 may receive wireless transmissions from one or more cellular base stations such as base stations 80 (e.g., a first base station 80-1, a second base station 80-2, etc.) and may transmit wireless signals to one or more of base stations 80. For example, one or more of antennas 40 may communicate with base station 80-1 over communications link 82, may communicate with base station 80-2 over communications link 84, or may simultaneously communicate with base stations 80-1 and 80-2 over both communications links 82 and 84.

Duplexer circuitry 66, diplexer circuitry 64, and switching circuitry 68 in front end 60 may selectively route signals received from base stations 80 and may selectively route signals transmitted to base stations 80 based on the frequency of the radio-frequency signals. For example, diplexer circuitry 64, duplexer circuitry 66, and switching circuitry 68 may be configured by control signals received from control circuitry 52 over path 76 to route transmit frequency signals and receive frequency signals in different uplink and downlink communications bands between one or more antennas 40 and corresponding transmitters 48 and receivers 50. Switching circuitry 68 may include multiple switches (e.g., multiple stages of switches) each of which is associated with a respective frequency range. The states of switches within switching circuitry 68 (i.e., which switch terminals are connected to each other in the switching circuitry) may be controlled by using control circuitry 52 using control signals received over path 76. Switches in switching circuitry 68 preferably have a sufficient number of terminals (switch ports) to allow all desired transmitters 48 and receivers 50 to be coupled to antennas 40. Switching circuitry 68 may include, for example, SP4T (single pole four throw), SP5T (single pole five throw) switches, or any other desired switches. Switches with more terminals or fewer terminals may be used if desired.

Base stations 80 may include wireless communications circuitry and one or more antennas 98 for communicating with device 10. Each base station 80 may include storage and processing circuitry such as circuitry 92. Storage and processing circuitry 92 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 92 may be used to control the operation of base stations 80. This processing circuitry may be based on one or more microprocessors, microcontrollers, digital signal processors, application specific integrated circuits, etc. For example, circuitry 92 may generate and transmit downlink signals for transmission to device 10 over antennas 98. In general, radio-frequency signals conveyed from transmitters 48 on device 10 to base stations 80 may sometimes be referred to as uplink signals, whereas radio-frequency signals conveyed from base stations 80 to receivers 50 on device 10 may sometimes be referred to as downlink signals.

If desired, storage circuitry 92 may be used to store device information 94. Device information 94 may include information about device 10 such as device identification information and connection settings associated with communications links 82 and/or 84 with which base stations 80 are in communication with device 10 (e.g., device settings used by device 10 to send and receive signals with base stations 80). If desired, storage circuitry 92 may store neighboring base station information 96. Base station information 96 may include information about other base stations 80 that are geographically nearby a given base station. For example, a first base station 80-1 may store information 96 identifying that base station 80-2 or other base stations are geographically near to base station 80-1. In general, neighboring base stations identified by information 96 may be any base station within a predetermined distance of a particular base station or may be other base stations having wireless coverage that overlaps with the wireless coverage of a particular base station. If desired, information 96 may include frequency information associated with the neighboring base stations. For example, information 96 may identify one or more communications frequencies (e.g., communications bands) that are being used by each neighboring base station 80.

Wireless signals received by device 10 from base stations 80 may be provided to diplexer circuitry 64 (e.g., to one or more diplexers within circuitry 64). Diplexer circuitry 64 may include circuitry that routes signals according to frequency. For example, diplexer circuitry 64 may have a low pass filter and a high pass filter that divide received wireless transmissions into low frequencies and high frequencies, respectively, while minimizing signal loss (e.g., while minimizing insertion loss). During signal transmission, low band signals and high band signals received from transmitters 48 may be combined by diplexer circuitry 64 and the resulting combined signals may be output to antennas 40.

Duplexer circuitry 66 may be formed from filter circuitry that provides high isolation between transmitted and received signals. For example, the radio-frequency signals transmitted by transmitters 48 may be much larger than the radio-frequency signals received by receivers 50 (e.g., tens of dBm larger). Duplexers 66 may help prevent the relatively large signals transmitted by the transmitters 50 from being received by receivers 48, thereby providing high isolation between the transmitters and the receivers. In other words, duplexer circuitry 66 may provide high out-of-band attenuation for transceiver circuitry 90. Control circuitry 52 may configure switching circuitry 68 to route transmit and receive signals between corresponding antennas 40 and the desired transmitter and receiver circuits.

Radio-frequency signals transmitted and received by the wireless communications circuitry 34 may be generated and operated on in accordance with the LTE communications protocol. The LTE communications protocol uses an Orthogonal Frequency-Division Multiplexing (OFDM) digital modulation scheme. The OFDM scheme is a type of frequency-division multiplexing scheme in which a large number of closely-spaced orthogonal subcarriers are used to carry data. Different variants of the OFDM scheme may be used for uplink signal transmission and downlink signal transmission, respectively. For example, downlink signals may be modulated using an Orthogonal Frequency Multiple Access (OFDMA) scheme and uplink signals may be modulated using a Single-Carrier Frequency Division Multiple Access (SC-FDMA) scheme. The closely-spaced orthogonal subcarriers may sometimes be referred to as frequency subcarriers, because each subcarrier may correspond to a range of frequencies (e.g., a range of frequencies having a bandwidth of 15 kHz). The data in each subcarrier may be modulated using respective digital modulation schemes such as quadrature phase shift keying (QPSK) and quadrature amplitude modulation (e.g., 16-QAM and 64-QAM). Base station such as base stations 80 may modulate downlink signals transmitted to device 10 using a selected modulation scheme and wireless circuitry 34 on device 10 may modulate uplink signals transmitted to base stations 10 using a selected modulation scheme.

Figure 4:
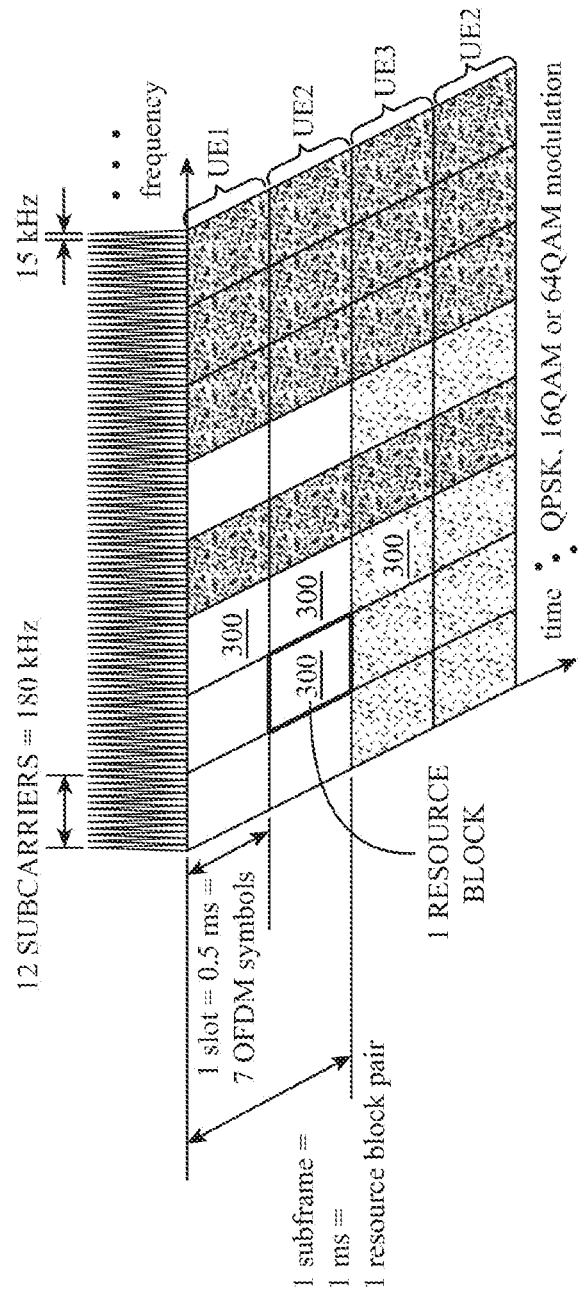
FIG. 4 is a diagram showing how wireless communications circuitry may transmit radio-frequency signals using a Long Term Evolution (LTE) protocol in accordance with an embodiment of the present invention.

As shown in FIG. 4, a designated user device may be given permission to transmit uplink signals during each time slot. For example, a first user device UE1 (e.g., a device such as device 10 of FIGS. 1-3) may transmit uplink signals to a corresponding base station 80 during a first time period, a second user device UE2 may transmit uplink signals to the base station during a second time period, a third user device UE3 may transmit uplink signals to the base station during a third time period, etc. In another suitable arrangement, a base station 80 may broadcast downlink signals intended for more than one user device during a given time slot (e.g., LTE may implement Orthogonal Frequency-Division Multiple Access for downlink transmission).

A wireless electronic device such as device 10 may simultaneously transmit uplink signals in multiple resource blocks 300 during each time slot. Each time slot is partitioned in time into a number of OFDM symbols. A resource block may serve as a basic scheduling unit that is defined as a set of consecutive OFDM symbols in the time domain and a set of consecutive frequency subcarriers in the frequency domain. For example, a resource block such as resource block 300 may be defined as 7 consecutive OFDM symbols in the time domain and 12 consecutive frequency subcarriers in the frequency domain. The set of consecutive OFDM symbols used to define a resource block may depend on a parameter such as a normal or extended Cyclic Prefix. Each resource block 300 may, for example, measure 0.5 ms by 180 kHz (i.e., assuming a subcarrier spacing of 15 kHz). This example is merely illustrative. In general, resource blocks may be defined as a set of consecutive OFDM symbols of any desired size in the time and frequency domains.

Each LTE frequency band (e.g., LTE band 1, LTE band 2, etc.) may include an associated uplink band and an associated downlink band. As an example, LTE band 1 has an uplink band from 1920-1980 MHz and a downlink band from 2110-2170 MHz. As another example, LTE band 5 has an uplink band from 824-849 MHz and a downlink band from 869-894 MHz. During communications operations, a wireless electronic device such as device 10 may transmit radio-frequency signals in the uplink band associated with a desired LTE frequency band and may receive radio-frequency signals in the downlink band associated with the desired LTE frequency band. For example, device 10 may receive radio-frequency signals in the downlink band associated with the desired LTE frequency band while continuously transmitting radio-frequency signals in the uplink band associated with the desired LTE frequency band.

Device 10 may transmit radio-frequency signals over a range of frequencies within a selected uplink band (this range of frequencies in a selected uplink band may sometimes be referred to as an uplink channel having an associated channel bandwidth). For example, a device 10 that is configured to transmit radio-frequency signals using LTE band 1 may be configured to transmit signals in an uplink channel centered at 1950 MHz with a channel bandwidth of 10 MHz (e.g., device 10 may transmit signals in a channel between frequencies 1945 MHz and 1955 MHz). In general, a device 10 that is configured to transmit signals using LTE band 1 may transmit signals in an uplink channel centered at any frequency from 1920-1980 MHz given that the channel bandwidth does not include frequencies outside of the frequency range of LTE band 1. Device 10 may receive radio-frequency signals over a range of frequencies within a selected downlink band (this range of frequencies in a selected downlink band may sometimes be referred to as a downlink channel having an associated channel bandwidth).

Different LTE bands (e.g., LTE band 1, LTE band 2, etc.) may each require device 10 to transmit and receive radio-frequency signals having selected channel bandwidths. For example, a device 10 that is configured to transmit radio-frequency signals in the uplink band of LTE band 1 may be required to transmit radio-frequency signals having a channel bandwidth of 5 MHz, 10 MHz, 15 MHz, or 20 MHz. In another example, a device 10 that is configured to receive radio-frequency signals in the uplink band of LTE band 5 may be required to receive radio-frequency signals having a channel bandwidth of 1.4 MHz, 3 MHz, 5 MHz, or 10 MHz. In general, each LTE band imposes respective requirements on the allowable channel bandwidth. Each uplink and downlink channel in each LTE band may be identified by a respective channel number such as an Absolute Radio Frequency Channel Number (ARFCN), an E-UTRA Absolute Radio Frequency Channel Number (EARFCN), etc. In other words, each channel may be numbered to identify the channel. Each LTE band may include one or more dedicated control channels over which control signals and measurement data may be conveyed between device 10 and external equipment. Control channels may be formed from reserved resource blocks (i.e., resource blocks that have been assigned to a respective control channel).

Figure 5:
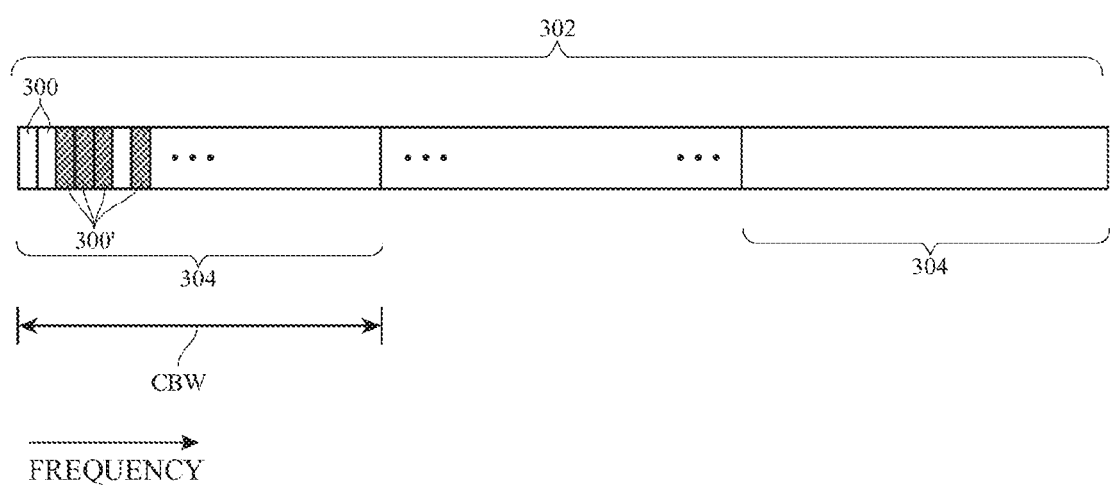
FIG. 5 is a diagram showing how wireless communications circuitry may communicate using one or more resource blocks of a radio-frequency channel in an LTE frequency band in accordance with an embodiment of the present invention.

FIG. 5 shows an illustrative LTE band 302 having multiple channels 304. Each channel in the LTE band of FIG. 6 has a corresponding channel bandwidth CBW. Each channel within band 302 may be any numbered channel in the uplink or downlink band of LTE band 302 (e.g., each channel 304 may be any desired uplink or downlink channel of the corresponding LTE band). Each channel 304 may be partitioned in frequency into a number of resource blocks 306. In general, band 302 may have any desired number of channels having any desired channel bandwidth, and each channel may have any desired number of resource blocks 300. As an example, each channel 304 may have a channel bandwidth CBW of 10 MHz and 50 resource blocks 300 and band 302 may have four channels 304. As another example, band 302 may have ten channels 304. In general, the number of channels and resource blocks in each channel may depend on the LTE band that is being used.

Figure 6:
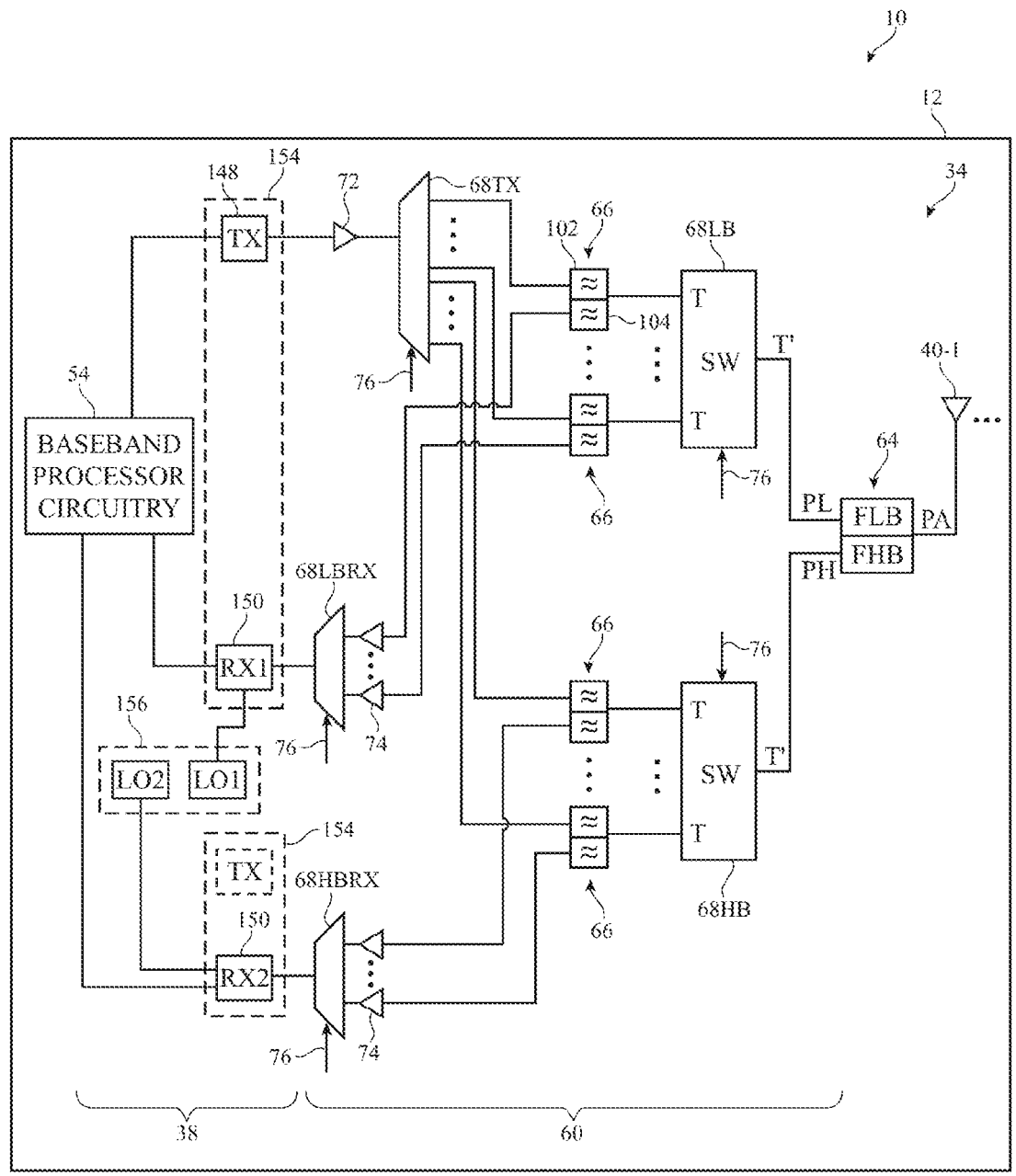
FIG. 6 is a circuit diagram of illustrative wireless communications circuitry that may be configured to simultaneously transmit and/or receive radio-frequency transmissions in different frequency bands with multiple wireless base stations in accordance with an embodiment of the present invention.

Device 10 need not utilize all of its available resource blocks 300. Device 10 may be configured to transmit or receive in only one resource block 300 or an allocated portion (e.g., a subset) of its resource blocks 300. If desired, device 10 may be configured to communicate in all available resource blocks. In the example of FIG. 6, device 10 communicates using shaded resource blocks 300' (e.g., device 10 may communicate using the third, fourth, fifth, and seventh resource blocks of channel 304). The particular resource blocks 300' that are used by device 10 may sometimes be referred to herein as the deployment, allocation, or configuration of resource blocks used by device 10. The deployment of resource blocks used by device 10 may include any desired number of resource blocks 300 starting at any desired position within the corresponding channel 304. Resource blocks deployed by device 10 may each be adjacent in frequency or may be separated in frequency by other unused resource blocks (as shown in the example of FIG. 6). During operation, device 10 may be configured to transmit using a particular resource block configuration (e.g., using a selected number of resource blocks beginning at a selected point in the corresponding channel). Similarly, base stations 80 may transmit downlink signals to device 10 using any desired configuration of resource blocks 300.

During communications operations by wireless communications circuitry 4 in device 10, antenna structures 40 may be used to simultaneously transmit uplink signals and receive downlink signals (e.g., wireless communications circuitry 34 may receive downlink signals in a channel of a downlink band and transmit uplink signals in a channel of an uplink band simultaneously). Duplexer circuitry 66 (FIG. 3) may partition radio-frequency signals into respective uplink and downlink signals.

Downlink signals received by antennas 40 may include a digital data stream having a series of binary bits "1" and "0." The digital data stream may, for example, be encoded using a desired modulation scheme (e.g., QPSK, 16-QAM, 64-QAM, etc.). Circuitry 92 in base stations 80 may include modulation circuitry for generating the downlink signals with a desired modulation scheme and amplifier circuitry for providing downlink signals at a desired downlink power level. Circuitry 92 may generate downlink signals using any desired number of LTE resource blocks (e.g., any desired resource block deployment) in any desired channel of any desired LTE band. Baseband module 54 may extract the digital data stream from the downlink signals received from base stations 80. The number of bits in the digital data stream that are successfully retrieved by baseband module 54 per second may be defined as the data reception throughput (sometimes referred to as data throughput or receive path data throughput) of wireless communications circuitry 34.

It may be desirable to simultaneously receive and/or transmit radio-frequency signals in two different frequency bands to increase data throughput in wireless communications circuitry 34. For example, device 10 may communicate with base stations 80 using a Long Term Evolution (LTE) protocol in which cellular base stations 80 may expect device 10 to receive data using two different LTE communications bands (a scheme sometimes referred to as carrier aggregation). As an example, a given base station such as base station 80-1 may require device 10 to simultaneously receive data on LTE band 4 and LTE band 17. To receive data on LTE band 4, device 10 may be configured to accommodate frequencies from 2110 MHz to 2155 MHz. To receive data on LTE band 17, device 10 may be configured to accommodate frequencies from 734 MHz to 746 MHz.

By receiving data using two different communications bands, device 10 may be provided with increased bandwidth. For example, a device 10 that simultaneously receives data streams in LTE band 4 and LTE band 17 may be provided with a communications bandwidth equal to the combination of the respective bandwidths of LTE band 4 and LTE band 17 (e.g., 45 MHz from LTE band 4 added to 12 MHz from LTE band 17). In this way, device 10 may be provided with improved data transmissions and throughput rates.

If desired, device 10 may simultaneously communicate with two or more base stations 80 in two different LTE communications bands (e.g., device 10 may perform carrier aggregation over multiple base stations 80). For example, device 10 may simultaneously communicate with a first base station 80-1 using LTE band 4 and with a second base station 80-2 using LTE band 17. To receive data on LTE band 4 from first base station 80-1, device 10 may be configured to accommodate frequencies from 2110 MHz to 2155 MHz. To receive data on LTE band 17 from second base station 80-2, device 10 may be configured to accommodate frequencies from 734 MHz to 746 MHz.

As an example, FIG. 6 shows one illustrative embodiment of device 10 with wireless communications circuitry 34 that is configured to simultaneously receive radio-frequency transmissions in different frequency bands from two different base stations 80. In the example of FIG. 6, wireless communications circuitry 34 includes a single transmitter and two receivers that are multiplexed with switching circuitry (e.g., 68 of FIG. 3) to accommodate all communications bands.

As shown in FIG. 4, wireless communications circuitry 34 may include an antenna such as antenna 40-1 that receives wireless transmissions (e.g., from one or more cellular base stations 80). Switching circuitry 68 may include multiple switching multiplexers (e.g., switch 68LB, 68HB, 68LBRX, 68TX, and 68HBRX may be formed as a part of switching circuitry 68 of FIG. 3 and may sometimes be referred to herein as switching stages, multiplexers, or switching multiplexers). The received wireless transmission may be provided to diplexer 64 via diplexer port PA. Diplexer 64 may include circuitry that routes signals according to frequency. For example, diplexer 64 may have filters FLB (e.g., a low pass filter) and FHB (e.g., a high pass filter) that divide received wireless transmissions into low frequencies and high frequencies, respectively, while minimizing signal loss (e.g., while minimizing insertion loss). Received signals with low frequencies may be routed to terminal T' of switch 68LB from diplexer port PL. Received signals with high frequencies may be routed to terminal T' of switch 68HB from diplexer port PH. During signal transmission, low band signals at port PL and high band signals at port PH may be combined by diplexer 64 and the resulting combined signals may be output at port PA.

Switches 68LB and 68HB may each have one or more terminals T. Switches 68LB and 68HB may be electrically controllable switches (e.g., transistor-based switches) that may each be configured by control signals received from control circuitry 52 (FIG. 3) via control paths 76 to couple a selected one of terminals T to terminal T'. Each terminal T of switches 68LB and 68HB may be coupled to a respective one of duplexers 66. Duplexers 66 may each have respective high and low band filters. For example, each duplexer may have a first filter such as filter 102 and a second filter such as filter 104. Filter 102 and filter 104 may separate radio-frequency signals into separate frequency bands corresponding to a transmit frequency bands and a receive frequency bands. Filters 102 may isolate frequencies that correspond to transmit (uplink) frequencies and provide the isolated frequencies to duplexer circuitry 66. Switching circuit 68TX may be configurable via control path 76 to couple transmitter 148 (e.g., a particular transmitter TX that is one of transmitters 48 of FIG. 3) to a desired duplexer 66. Filters 104 may isolate frequencies that correspond to receive (downlink) frequencies. By configuring the frequency responses of filters 102 and 104, each duplexer 66 (and an associated terminal T) may be configured to handle signals associated with a particular communications band. For example, a first terminal T may be associated with LTE band 4 and a second terminal T may be associated with LTE band 17.

To simultaneously receive radio-frequency transmissions in different frequency bands, filters 104 that are coupled to switch 68LB may be coupled to switching circuit 68LBRX and filters 104 that are coupled to switch 68HB may be coupled to switching circuit 68HBRX. Switching circuitry 68LBRX and 68HBRX may be implemented using electrically controllable switches (e.g., transistor-based switches) that are configurable via control terminals 76. Switch 68LBRX may be coupled to a first receiver 150 (e.g., a particular receiver RX1 that is one of receivers 50 of FIG. 3) and switch 68HBRX may be coupled to a second receiver 150 (e.g., an additional receiver RX2 of receiver circuits 50). Receiver RX1 may receive radio-frequency signals that correspond to relatively low frequencies. Receiver RX2 may receive radio-frequency signals that correspond to relatively high frequencies.

As an example, a device 10 that communicates with base stations 80 using the LTE standard may simultaneously receive radio-frequency transmissions in band 4 (e.g., a frequency band that corresponds to relatively high frequencies) from a first base station 80-1 and in band 17 (e.g., a frequency band that corresponds to relatively low frequencies) from a second base station 80-2 (as shown in FIG. 3). In this scenario, the radio-frequency transmissions received by device 10 via antenna 40-1 may be partitioned by diplexer 64 into signals that correspond to band 4 and signals that correspond to band 17.

The signals that correspond to band 4 may be received by switch 68HB and forwarded to a first duplexer 66 that is configured to accommodate the frequencies associated with band 4. The first duplexer 66 may partition the frequencies associated with band 4 into a transmit band and a receive band (e.g., a transmit band corresponding to 1710 MHz through 1755 MHz and a receive band corresponding to 2110 MHz through 2155 MHz) and provide the signals associated with the receive band to multiplexer 68HBRX and receiver RX2. Receiver RX2 may process the signals associated with the receive band (e.g., receiver RX2 may demodulate the signals and provide the signals to a baseband processor).

The signals that correspond to band 17 may be received by switch 68LB and forwarded to a second duplexer 66 associated with band 17. The second duplexer 66 may partition the frequencies associated with band 17 into a transmit band and a receive band (e.g., a transmit band corresponding to 704 MHz through 716 MHz and a receive band corresponding to 734 MHz through 746 MHz) and provide the signals associated with the receive band to multiplexer 68LBRX and receiver RX1 for processing.

To allow receiver RX1 and RX2 to simultaneously receive radio-frequency signals in different communications bands, each receiver may, if desired, be coupled to a respective local oscillator. Receiver RX1 may be coupled to local oscillator LO1 and receiver RX2 may be coupled to local oscillator LO2. Local oscillators LO1 and LO2 may generate signals with appropriate frequencies (e.g., sinusoidal signals or other desired signals with appropriate frequencies) for receivers RX1 and RX2 to use for processing radio-frequency signals. For example, receiver RX1 may receive radio-frequency signals corresponding to LTE band 17. In this scenario, local oscillator LO1 may be tuned to provide a signal with an appropriate frequency for demodulating radio-frequency signals associated with LTE band 17.

The use of two separate local oscillators LO1 and LO2 to provide receivers RX1 and RX2 with respective signals is merely illustrative. If desired, local oscillating circuitry 156 may provide receivers RX1 and RX2 with two signals with different frequencies. For example, local oscillating circuitry 156 may include a single local oscillator configured to generate a first signal at a first frequency and the first signal may be provided to receiver RX1. Local oscillating circuitry 156 may also include frequency dividing circuitry configured to use the first signal to generate a second signal at a second frequency and the second signal may be provided to receiver RX2.

In this way, radio-frequency transmissions that are received by device 10 may be simultaneously processed. By simultaneously processing two different frequency bands, device 10 may be provided with increased communications bandwidth, thereby increasing data throughput and transmission rates. By simultaneously receiving signals in each frequency band from different base stations 80, device 10 may increase throughput regardless of the geographical location of device 10 relative to a given one of the base stations (e.g., even when device 10 is far away from one of the base stations).

The use of the circuitry of FIG. 6 to handle signals associated with LTE bands 4 and 17 is merely illustrative. Any two different communications bands may be simultaneously received by configuring wireless communications circuitry 34 to accommodate the desired frequency bands. For example, LTE band 2 may be simultaneously received with LTE band 17, LTE band 5, the MediaFLO band, or other desired frequency bands. As another example, LTE band 4 may be simultaneously received with LTE band 5 or the MediaFLO band, LTE band 1 may be simultaneously received with LTE band 8 or with LTE band 20, LTE band 3 may be simultaneously received with LTE band 8 or band 20, etc. If desired, more than two frequency bands may be simultaneously handled in this way. For example, multiple diplexers may be arranged in stages to divide received radio-frequency signals into a desired number of frequency bands that are processed by respective receivers, triplexers may be used to divide received radio-frequency signals into three frequency bands, quadplexers may be used to divide signals into four frequency bands, any desired number of transmitters TX and receivers RX may be used to transmit and receive signals in any desired number of bands using any desired number of antennas 40, etc.

Receivers RX1 and RX2 may be formed as part of transceiver circuitry or as separate circuits. For example, receiver RX1 and/or receiver RX2 may be combined with transmitter TX to form a transceiver or may be implemented separately as distinct receiver and transmitter circuits. If desired, a first optional transceiver 154 may be formed from the combination of receiver RX1 and transmitter TX and a second optional transceiver 154 may be formed from the combination of receiver RX2 and an additional transmitter TX.

Receivers RX1 and RX2 and transmitter TX may be coupled to baseband processor circuitry 54. Receivers RX1 and RX2 may process radio-frequency signals received from switches 68LBRX and 68HBRX and provide the processed radio-frequency signals to baseband processor circuitry 54. For example, receiver RX1 may receive radio-frequency signals corresponding to LTE band 17 and demodulate the radio-frequency signals to form baseband signals. In this scenario, the baseband signals may be processed by baseband processor circuitry 152. For example, baseband processor circuitry 54 may decode a modulation scheme associated with the received signals. Baseband processor circuitry 54 may merge the signals that were simultaneously received over each of the bands into a single data stream.

Figure 7:
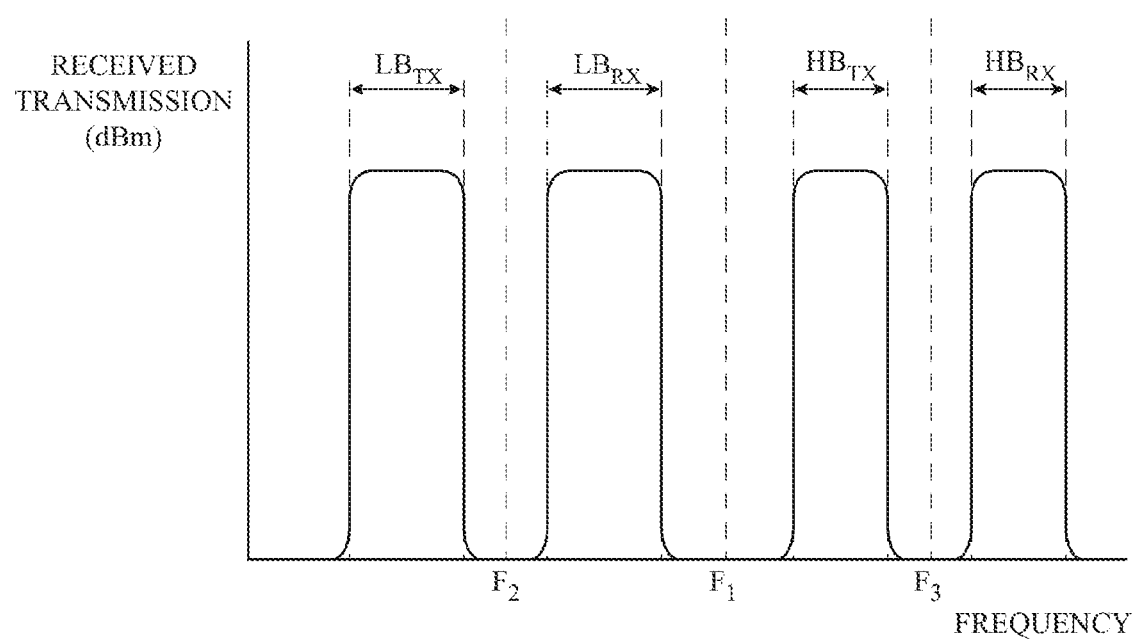
FIG. 7 is a graph of illustrative frequency bands that may be simultaneously received with wireless communications circuitry such as the wireless communications circuitry of FIG. 6 in accordance with an embodiment of the present invention.

FIG. 7 is a graph showing illustrative bands of radio-frequency signals that may be handled using the circuitry of FIG. 6. In the example of FIG. 7, frequency band LBTX may correspond to a low transmit frequency band such as 704-716 MHz for LTE band 17 and LBRX may correspond to a low receive frequency band such as 734-746 MHz for LTE band 17 (e.g., LBTX may correspond to the transmit band of LTE band 17 and LBRX may correspond to the receive band of LTE band 17). Frequency band HBTX may correspond to a high transmit frequency band such as 1710-1755 MHz for LTE band 4 and HBRX may correspond to a high receive frequency band such as 2110-2155 MHz for LTE band 4 (e.g., HBTX may correspond to the transmit band of LTE band 4 and HBRX may correspond to the receive band of LTE band 4).

Diplexer 64 may be configured to partition the radio-frequency transmissions into a first signal partition of frequencies below F1 and a second signal partition of frequencies above F1 (e.g., filter FLB may be configured to provide the first signal partition to switch 68LB and filter HLB may be configured to provide the second signal partition to switch 68HB). Switch 68LB may be configured to couple a first duplexer 66 associated with frequency bands LBTX and LBRX to filter FLB. Switch 68HB may be configured to couple a second duplexer 66 associated with frequency bands HBTX and HBRX to filter HLB.

First duplexer 66 may be configured to isolate low transmit band LBTX from low receive band LBRX (e.g., using filters to isolate frequencies lower than F2 from frequencies higher than F2). Second duplexer 66 may be configured to isolate high transmit band HBTX from high receive band HBRX (e.g., using filters to isolate frequencies lower than F3 from frequencies higher than F3). Low receive band LBRX may be provided to a first receiver RX1 and high receive band HBRX may be provided to a second receiver RX2. In this way, two different frequency bands may be simultaneously received and processed by wireless communications circuitry 34.

Figure 8:
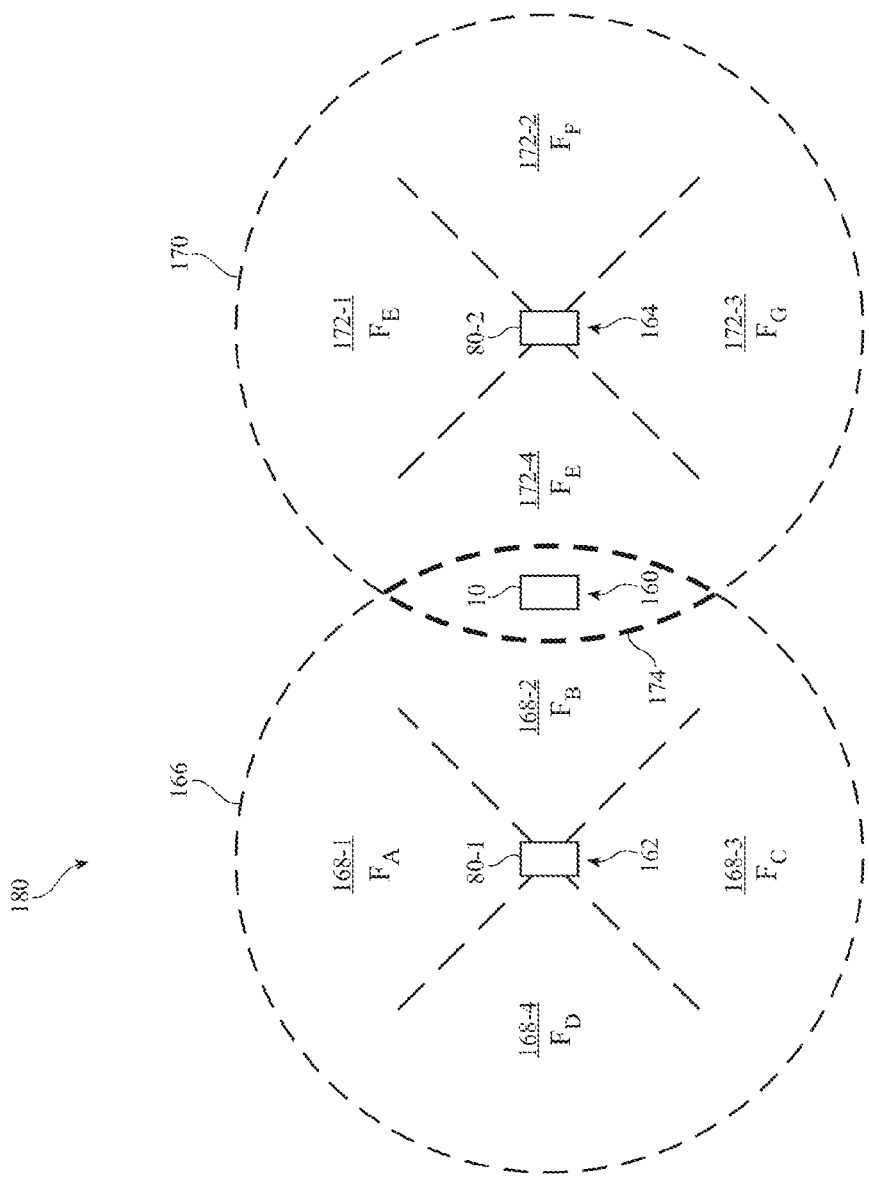
FIG. 8 is a diagram showing how a wireless device may simultaneously communicate with multiple wireless base stations at different geographic locations using different frequency bands in accordance with an embodiment of the present invention.

FIG. 8 is an illustrative diagram showing how device 10 may perform carrier aggregation using two wireless base stations 80 (e.g., two cellular communications towers) at different geographical locations in a network (e.g., a cellular network). As shown in FIG. 6, device 10 may be located at geographic location 160. Network 180 may include first and second wireless base stations 80-1 and 80-2. Network 180 may be operated by one or more network operators or managers (e.g., one or more network providers). First base station 80-1 may be located at geographic location 162 and a second base station 80-2 may be located at geographic location 164. First base station 80-1 may have a region of wireless coverage 166. Region 166 may represent the locations at which first base station 80-1 can adequately transmit and receive radio-frequency signals with a wireless device such as device 10 (e.g., a region of wireless coverage in which first base station 80-1 can transmit and/or receive signals with a wireless device without dropping the wireless link between base station 80-1 and the wireless device, a region in which the wireless device can receive signals from first base station 80-1 at a desired signal power level, a region in which base station 80-1 can receive signals from the wireless device at a desired signal power level, a region in which signals received by the wireless device and/or base station 80-1 have sufficient signal quality, etc.).

In one suitable arrangement, base station 80-1 may communicate with wireless devices within coverage region 166 using a desired communications band. In another suitable arrangement, region 166 may be divided into two or more zones of coverage 168 each having a corresponding communications band with which base station 80-1 communicates with wireless devices within that zone 168. In the example of FIG. 6, region 166 is divided into four coverage zones 168 each having a respective communications band (e.g., a first zone 168-1 having a first communications band $F_A$, a second zone 168-2 having a second communications band $F_B$, a third zone 168-3 having a third communications band $F_C$, and a fourth zone 168-4 having a fourth communications band $F_D$). In this scenario, wireless electronic device 10 is at location 160 that is within zone 168-2 of first base station 80-1, and first base station 80-1 may communicate with device 10 using the corresponding communications band $F_B$.

Second base station 80-2 may communicate with wireless devices within coverage region 170 using a desired communications band. In another suitable arrangement, region 170 may be divided into two or more zones of coverage 172 each having a corresponding communications band with which base station 80-2 communicates with wireless devices within that zone 172. In the example of FIG. 8, region 170 is divided into four coverage zones 172 each having a respective communications band (e.g., a first zone 172-1 having a fifth communications band $F_E$, a second zone 172-2 having a second communications band $F_F$, a third zone 172-3 having a third communications band $F_G$, and a fourth zone 172-4 having a fourth communications band $F_E$). In this scenario, wireless electronic device 10 is at location 160 that is within zone 172-4 of second base station 80-2, and second base station 80-2 may communicate with device 10 using the corresponding communications band $F_E$.

When device 10 is located within the wireless coverage region of multiple base stations 80, device 10 may perform carrier aggregation using multiple base stations 80 so that wireless signals are simultaneously received from the base stations in different communications bands (e.g., with improved data throughput relative to communications over a single communications band). In the example of FIG. 8, device 10 is located within an overlapping region 174 between coverage region 166 associated with first base station 80-1 and coverage region 170 associated with second base station 80-2, and may perform carrier aggregation to simultaneously communicate with both first base station 80-1 and second base station 80-2. When performing carrier aggregation, device 10 may perform communications operations with each base station 80 in the communication band associated with the coverage zone in which device 10 is located. For example, as shown in FIG. 6, device 10 may perform carrier aggregation to simultaneously communicate with first base station 80-1 in communications band $F_B$ and with second base station 80-2 in communications band $F_E$.

As one example, band $F_B$ may include relatively high frequencies, whereas frequency band $F_E$ may include relatively low frequencies. Diplexer circuitry 64 in device 10 may route signals received in low band $F_E$ from base station 80-2 to switch 68LB for conveying to first receiver RX1 (as shown in FIG. 4) and may route signals received in high band $F_B$ from base station 80-1 to switch 68HB for conveying to second receiver RX2. In scenarios where device 10 communicates with base stations 80 using the LTE standard, device 10 may simultaneously receive radio-frequency transmissions in band 4 (e.g., a frequency band that corresponds to relatively high frequencies) from first base station 80-1 and in band 17 (e.g., a frequency band that corresponds to relatively low frequencies) from second base station 80-2 (e.g., band $F_B$ may be LTE band 4 and band $F_E$ may be LTE band 17). In this scenario, the radio-frequency transmissions received by device 10 may be partitioned by diplexer 64 into signals that correspond to band 4 and signals that correspond to band 17. This example is merely illustrative. If desired, each coverage zone 168 and 172 may correspond to a respective channel 304 within an associated LTE band or may correspond to any other desired frequency range. If desired, the configuration of switching circuitry 68, duplexers 66, and/or diplexer 64 may be adjusted (e.g., using control signals generated by control circuitry 52) to route signals received simultaneously from multiple base stations 80 in different bands to the corresponding receiver circuits 50 for handling signals at those frequencies.

The example of FIG. 8 is merely illustrative. If desired, coverage regions 166 and 170 may have any desired shape (e.g., the shape of coverage regions 166 and 170 may be determined by the configuration of the wireless circuitry and antennas 98 on base stations 80, by the geography and topography of the area in which base stations 80 are located, by objects such as trees or buildings surrounding the base stations, etc.). Coverage regions such as regions 166 and 170 may have any desired number of coverage zones for handling radio-frequency signals in any desired number of communications bands. If desired, one or more of coverage zones 172 of second base station 80-2 may have associated communications bands that are the same as one or more of coverage zones 168 of first base station 80-1. Device 10 may perform carrier aggregation with any desired number of base stations 80 (e.g., overlapping coverage region 174 may be located within the coverage regions of three, four, or more than four base stations). For example, device 10 may simultaneously receive signals from three base stations 80, four base stations 80, more than four base stations 80, etc.

Each base station 80 may maintain information about other nearby base stations 80 in storage circuitry 92 (as shown in FIG. 3). For example, in the embodiment of FIG. 6, base station 80-1 may store information 96 that identifies base station 172 as a neighboring base station. Information 96 may include information identifying coverage region 170 and the corresponding zones 172 associated with base station 172. For example, information 96 may include information about which coverage zones 172 and the corresponding communication bands of base station 80-2 overlap with coverage zones 168 of base station 80-1 (e.g., base station 80-1 may include information 96 that identifies that coverage zone 172-4 of base station 80-2 has a corresponding communications band $F_E$ and overlaps with coverage zone 168-2 of base station 80-1 in which device 10 is located).

If desired, neighboring base station information 96 may be predetermined and stored on storage 92 prior to communications with device 10. For example, a network operator associated with base stations 80 may load information 96 onto base stations 80 so that each base station stores information about the neighboring base stations and how the corresponding coverage zones overlap in space. As the operating conditions of network 180 can change over time, neighboring base station information may be updated during normal operations of network 180 so that information 96 reflects any changes to network 180. For example, neighboring base station information 96 may be manually or automatically updated to reflect changes in network 180 such as when additional base stations 80 are added to network 180, when base stations 80 are removed from network 180, when neighboring base stations change their corresponding zones or regions of coverage, when neighboring base stations change frequency bands, etc. If desired, each base station 80 may be coupled together using wired or wireless communications links so that information such as handover information, updated neighboring base station information 96, control signals, or information about wireless devices such as device 10 (e.g., device information 94 of FIG. 3) can be conveyed between base stations 80.

When performing carrier aggregation with multiple base stations 80, device 10 may first establish a wireless connection with a single base station such as base station 80-1. The first base station with which device 10 establishes a wireless may sometimes be referred to herein as Primary Component Carriers (PCCs) or primary base stations. Radio-frequency signals conveyed between the PCC and device 10 may sometimes be referred to herein as primary component carrier signals, primary signals, primary component signals, primary carrier signals, or PCC signals, and the wireless links between the primary base stations and device 10 may sometimes be referred to herein as primary connections or primary wireless links. Once a connection is established between device 10 and the PCC, device 10 may establish an additional wireless connection with another base station 80 such as base station 80-2 without dropping the connection with the primary base station, and may simultaneously communicate with both base stations (e.g., using different frequency bands in a carrier aggregation scheme). Additional base stations that establish a connection with device 10 after device 10 has established a wireless connection with a primary base station may sometimes be referred to herein as Secondary Component Carriers (SCCs) or secondary base stations. Radio-frequency signals conveyed between the SCCs and device 10 may sometimes be referred to herein as secondary component carrier signals, secondary signals, secondary component signals, secondary carrier signals, or SCC signals, and the wireless links between the secondary base stations and device 10 may sometimes be referred to herein as secondary connections or secondary wireless links. Device 10 may establish a connection with a primary base station and one or more secondary base stations in downlink and uplink communications bands.

When establishing a connection with a base station 80, device 10 and the base station may compare received signals (e.g., computed performance metric information associated with the received signals) to predetermined performance metric standards to determine whether an adequate connection has been established. For example, device 10 may measure a signal strength of the received signals and may compare the measured signal strength to a signal strength threshold. If the measured signal strength is greater than the threshold, device 10 may determine that an adequate connection has been established.

Base stations 80 and device 10 may establish a wireless connection using a set of connection settings (sometimes referred to herein as device connection settings, wireless connection settings, or wireless device connection settings). The connection settings may include any desired settings associated with the configuration of wireless circuitry in base stations 80 and the configuration of wireless circuitry 34 (e.g., configurations for duplexers 66, diplexers 64, switching circuitry 68, antennas 40, amplifiers 72 and 74, transceiver 90, and baseband circuitry 54 of device 10) for establishing a wireless connection between device 10 and base stations 80 and for transmitting and/or receiving wireless signals between device 10 and base stations 80. As an example, the connection settings may include uplink power level settings (e.g., the uplink power level provided to transmitted signals by amplifiers 72 in device 10), downlink power level settings (e.g., the downlink power level provided to transmitted signals by amplifiers in base stations 80), power amplifier offset settings, power ratio index settings, path loss adjustment settings (offsets), uplink and downlink code rate settings, uplink and downlink data rate settings (e.g., data rates associated with the uplink and downlink signals generated by device 10 and base stations 80), uplink and downlink modulation scheme settings (e.g., modulation schemes used by baseband processor 54 and/or base station 80 to modulate uplink and downlink signals), uplink and downlink resource block deployment settings (e.g., the number of resource blocks to use for transmitting uplink and downlink signals), throughput settings, scheduling settings, target power level settings, uplink and downlink bandwidth settings, uplink and downlink channel settings, frequency settings, cyclic prefix settings, or any other desired wireless connection settings.

Device 10 and a given base station 80 may attempt to establish a connection using first set of connection settings (e.g., using a first downlink or uplink power level, bandwidth setting, resource block configuration, etc.). If an adequate wireless connection cannot be established using the first connection settings (e.g., if signals received by the base station and/or device 10 are characterized by insufficient performance metric information), device 10 and/or base station 80 may cycle through different connection settings until an adequate connection is established. Establishing a wireless connection between device 10 and base stations 80 in such a manner can be time consuming and can, when performed for additional base stations such as when establishing a wireless connection using carrier aggregation (sometimes referred to herein as establishing a carrier aggregation link) with multiple base stations 80, result in delays in establishing a wireless connection and device 10. It may therefore be desirable to be able to provide improved methods for establishing a wireless connection for performing carrier aggregation between an electronic device and wireless base stations.

Figure 9:
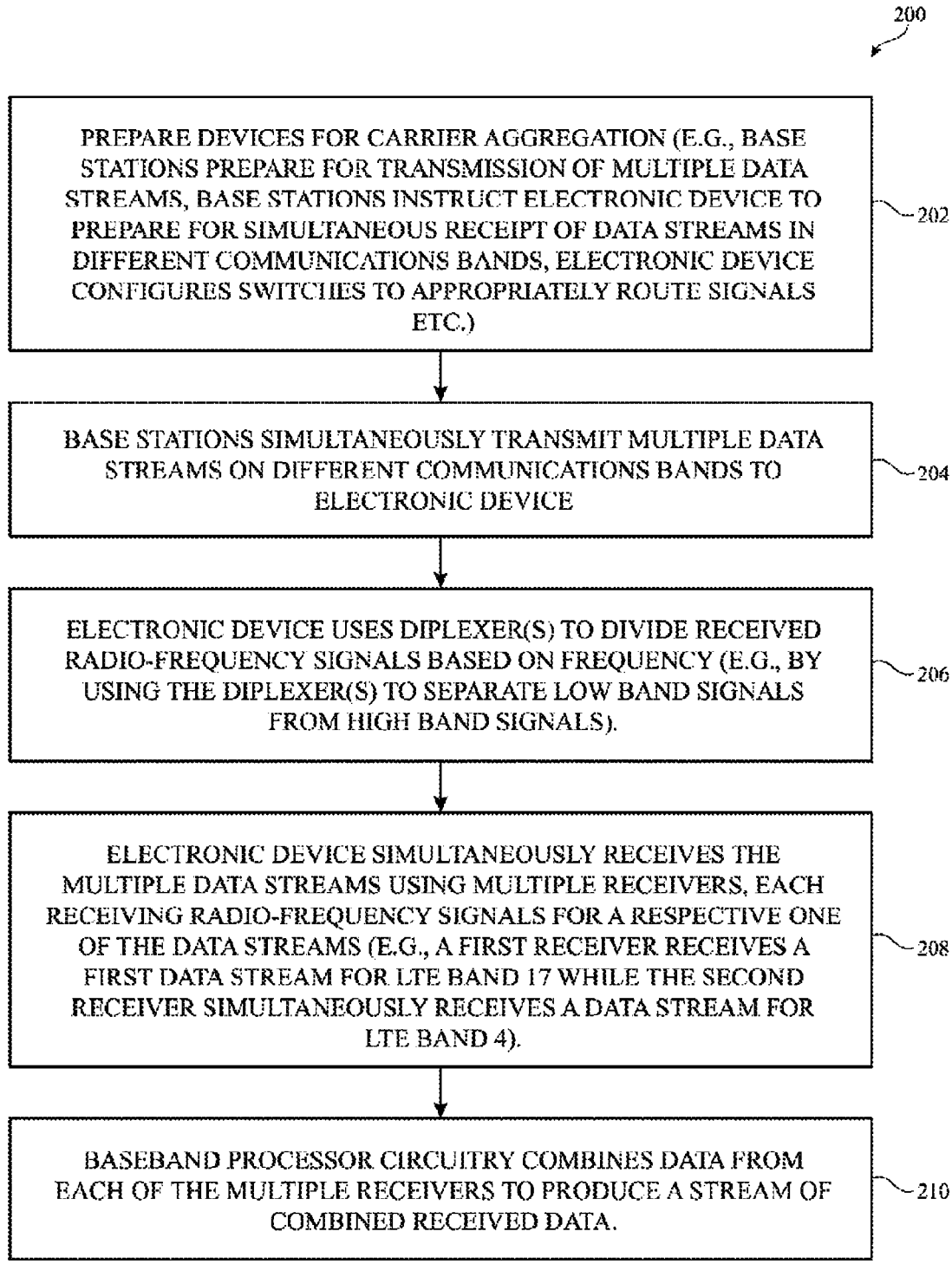
FIG. 9 is a flow chart of illustrative steps that may be performed with wireless network and a wireless device to simultaneously receive radio-frequency transmissions in different frequency bands from multiple wireless base stations in accordance with an embodiment of the present invention.

To communicate in a carrier aggregation mode (e.g., to communicate between cellular base stations 80 and a wireless device 10 using simultaneous radio-frequency transmissions in different communications bands over a carrier aggregation link), the steps of the illustrative flowchart of FIG. 9 may be performed.

At step 202, a first cellular base station such as base station 80-1 of FIG. 6, a second cellular base station such as base station 80-2, and wireless electronic device 10 may prepare for carrier aggregation operations. For example, device 10 may establish a first (primary) connection with first base station 80-1 using selected connection settings. Base stations 80 may prepare for transmission of multiple data streams and may instruct the wireless electronic device to prepare for simultaneous receipt of multiple data streams in different communications bands (e.g., base station 80-1 or base station 80-2 may instruct the wireless electronic device to operate in a carrier aggregation mode). The multiple data streams may be generated by dividing a single source data stream into multiple portions (e.g., a single source data stream may be divided into first and second portions and provided from other networking equipment in network 180 to base stations 80-1 and 80-2, respectively). In response to receiving instructions to prepare for simultaneous receipt of multiple data streams, the wireless electronic device may configure switches 68 to make appropriate routing connections (e.g., the switches may be configured to route each communications band to a respective receiver 50).

If desired, first base station 80-1 may determine whether device 10 is to operate in carrier aggregation mode prior to instructing device 10 to prepare for carrier aggregation. For example, first base station 80-1 may identify a coverage zone (e.g., coverage zone 168-2) in which device 10 is located and may identify whether that coverage zone overlaps in space with a coverage zone of second base station 80-2 based on stored neighboring base station information 96. If the coverage zone of second base station 80-2 overlaps with the coverage zone of base station 80-1 in which device 10 is located, first base station may instruct device 10 to configure wireless circuitry 34 for carrier aggregation (e.g., base station 80-1 may instruct device 10 to perform carrier aggregation in a communications band corresponding to the coverage zone 172 of second base station 80-2 in which device 10 is located and device 10 may configure switching circuitry 68, diplexer circuitry 64, and duplexer circuitry 66 to handle simultaneous communications in that communications band and the communications band that is being used by first base station 80-1). In another suitable arrangement, device 10 may determine whether to operate in carrier aggregation mode. For example, if data throughput is satisfactory without using carrier aggregation, device 10 may determine that carrier aggregation operations are not necessary and may subsequently communicate with base station 80-1 using a single frequency band.

Once device 10 has prepared for simultaneous receipt of multiple data streams in different communications bands, device 10 may establish a connection with second base station 80-1. Using the example of FIG. 8, device 10 may first establish a primary connection with first base station 80-1. Device 10 may establish the primary connection with first base station 80-1 using selected connection settings (e.g., device 10 may communicate with first base station 80-1 in communications band $F_B$ corresponding to the coverage zone in which device 10 is located, with selected uplink and downlink power levels, modulation schemes, etc.). First base station 80-1 may identify that device 10 is located in coverage zone 168-2 having corresponding frequency band $F_B$. First base station 80-1 may identify that second base station 80-2 has a coverage zone 172-4 and corresponding frequency band $F_E$ that overlaps with coverage zone 168-2 based on stored neighboring base station information 96. First base station 80-1 may subsequently instruct device 10 to prepare for carrier aggregation using frequency bands $F_B$ and $F_E$. Control circuitry 52 in device 10 may provide control signals to front end circuitry 60 over path 76 to configure diplexer circuitry 64, duplexer circuitry 66, and switching circuitry 68 to handle simultaneous transmission/reception of signals in frequency bands $F_B$ and $F_E$. Device 10 may subsequently establish a secondary wireless connection with second base station 80-2 in communications band $F_E$.

At step 204, base stations 80 may simultaneously transmit multiple data streams on different communications bands to wireless electronic device 10. For example, first base station 80-1 may transmit a first data stream on LTE band 17 and second base station 80-2 may transmit a second data stream on LTE band 4.

At step 206, electronic device 10 may use multiplexing circuitry such as diplexer 64 and duplexers 66 to divide radio-frequency signals that are received from base stations 80-1 and 80-2 based on frequency. For example, electronic device 10 may use diplexer 64 to divide radio-frequency signals received by an antenna 40-1 from base stations 80-1 and 80-2 into relatively low frequencies and relatively high frequencies. The relatively low frequencies may be provided to a first switch 68LB that has been configured (e.g., configured during step 202) to route the relatively low frequencies to a first duplexer 66. The relatively high frequencies may be provided to a second switch 68HB and routed to a second duplexer 66. The first duplexer 66 may isolate a first data stream received from base station 80-1 at the relatively low frequencies and provide the first data stream to receiver RX1. The second duplexer 66 may isolate a second data stream from the relatively high frequencies and provide the second data stream to receiver RX2.

At step 208, electronic device 10 may simultaneously receive the multiple data streams using multiple receivers. For example, receiver RX1 may demodulate a first data stream and provide the demodulated first data stream to the base station. Receiver RX2 may demodulate a second data stream and provide the demodulated second data stream to baseband processing circuitry 54.

At step 210, baseband processing circuitry 54 may simultaneously receive the demodulated first and second data streams and combine the demodulated first and second data streams to reconstruct the single source data stream.

Figure 10:
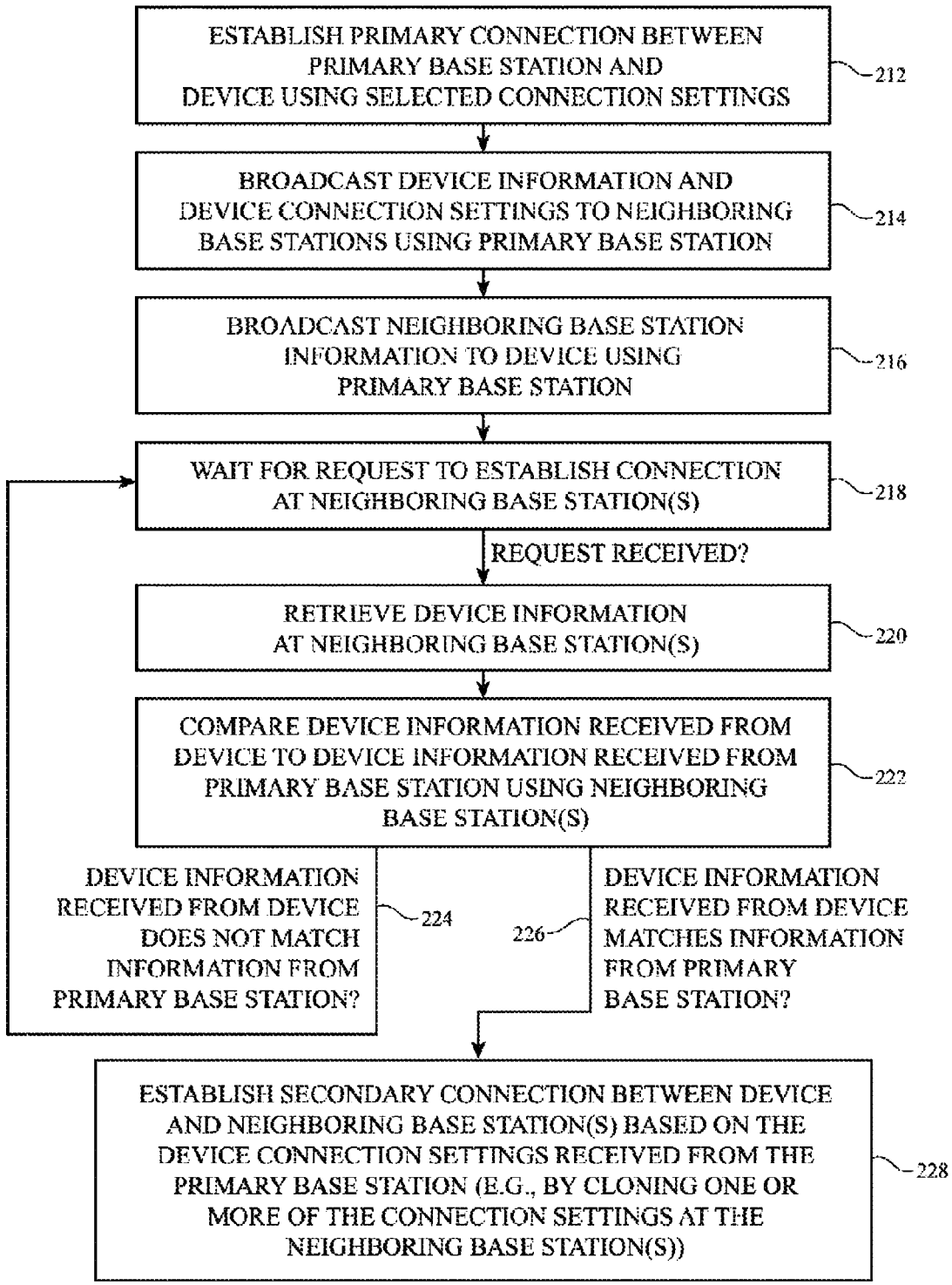
FIG. 10 is a flow chart of illustrative steps that may be performed by a wireless network to establish simultaneous wireless connections between a wireless device and multiple wireless base stations in different frequency bands by conveying device connection settings between the wireless base stations in accordance with an embodiment of the present invention.

FIG. 10 shows a flow chart of illustrative steps that may be performed by base stations 80 in a cellular network such as network 180 of FIG. 6 for preparing device 10 and base stations 80 for carrier aggregation operations (e.g., for establishing primary and secondary connections between device 10 and base stations 80). The steps of FIG. 8 may, for example, be performed while processing step 202 of FIG. 7.

At step 212, first base station 80-1 may establish a primary connection with device 10. For example, device 10 may send a wireless request to first base station 80-1 and base station 80-1 may send a wireless response to device 10. Device 10 may attempt to establish the connection with first base station 80-1 using selected connection settings (e.g., selected uplink and downlink connection settings). In one suitable arrangement, device 10 and base station 80-1 may cycle through connection settings until an adequate connection between base station 80-1 and device 10 is established. The connection settings with which the connection between device 10 and base station 80-1 was successfully established may be stored as a portion of device information 94 on storage circuitry 92.

If desired, first base station 80-1 may receive device identification information from device 10 (e.g., a unique device identification number, registration number, serial number, time stamp information, geo-location information such as GPS information associated with the geographic location of device 10, etc.). First base station 80-1 may store the received device identification information as a portion of device information 94 on storage circuitry 92. If desired, base station 80-1 may identify a coverage zone 168 in which device 10 is located and may store the information about the identified coverage zone as a portion of device information 94.

First base station 80-1 may compare device information 94 to stored neighboring base station information 96 to determine whether to instruct device 10 to prepare for carrier aggregation with an additional (SCC) base station. For example, base station 80-1 may determine whether neighboring base station information 96 identifies a neighboring base station having a coverage region 170 that overlaps with coverage zone 168 in which device 10 is located. In another suitable arrangement, base station 80-1 may compare geo-location information received from device 10 to neighboring base station information 96 to determine whether device 10 is within an overlapping coverage region 170. If base station 80-1 determines that device 10 is located within a region of coverage associated with an additional base station such as base station 80-2, device 10 may identify a corresponding frequency band associated with the coverage zone 172 of the additional base station in which device 10 is located.

At step 214, first base station 80-1 may broadcast device information 94 associated with device 10 to other base stations 80 in network 180. In one suitable arrangement, first base station 80-1 may broadcast device information 94 to all neighboring base stations identified in stored neighboring base station information 96. In another suitable arrangement, base station 80-1 may broadcast device information 94 to the base station 80-2 having the coverage region 170 in which device 10 is located. Second base station 80-2 may store device information 94 associated with device 10 in the corresponding circuitry 92.

At step 216, first base station 80-1 may transmit some or all of neighboring base station information 96 to device 10 to instruct device 10 to prepare for carrier aggregation operations in the frequency band associated with additional base station 80-2. Device 10 may use the neighboring base station information to broadcast a connection request (e.g., in the frequency band identified by the neighboring base station information). This step is merely illustrative. If desired, step 216 may be performed prior to step 214 to broadcast the device information before broadcasting the neighboring base station information.

At step 218, second base station 80-2 may wait until a request to establish a wireless connection is received from a wireless device. Once second base station 80-2 has received a request to establish a connection from a wireless device (e.g., a request from a wireless device within coverage region 170), processing may proceed to step 220.

At step 220, second base station 80-2 may retrieve device information associated with the wireless device that sent the request. For example, second base station 80-2 may identify device information included within the received request or base station 80-2 may request the device information after receiving the request to establish the connection from the wireless device. The retrieved device information may include, for example, a unique device identification number, registration number, serial number, time stamp information, geo-location information such as GPS information associated with the geographic location of device 10, or any other desired information about the device that sent the request to establish the connection.

At step 222, second base station 80-2 may compare the retrieved device information to device information 94 received from first base station 80-1 to determine whether the wireless device that sent the request is the wireless device for which base station 80-1 is attempting to prepare for carrier aggregation. If the received device information does not match device information 94 (e.g., if the device that sent the request is a wireless device in coverage region 170 other than device 10 that is independently attempting to establish a connection, etc.), processing may loop back to step 218 (as shown by path 224) to wait for additional requests to establish a connection. In this way, base station 80-2 may avoid attempting to establish a carrier aggregation connection with devices that are not in communication with other base stations 80 in network 180 or that are not attempting to establish a carrier aggregation connection. If desired, base station 80-2 may establish an independent wireless connection with other wireless devices that do not match device information 94.

If the received device information matches device information 94 (e.g., if the wireless device that sent the request to base station 80-2 is the same device that established the primary connection with base station 80-1), processing may proceed to step 228 as shown by path 226.

At step 228, base station 80-2 may establish a secondary wireless connection with device 10 using one or more of the device connection settings received from first base station 80-1. If desired, base station 80-2 may clone one or more of the device connection settings with which a successful connection was established with first base station 80-1 when attempting to establish a connection with device 10. For example, secondary base station 80-2 may use the same downlink power level, modulation scheme, resource block deployment, and/or bandwidth that were used to establish the primary connection between device 10 and primary base station 80-1. As the cloned connection settings have already been used to successfully connect to device 10 using base station 80-1, there is a high probability that one or more of the connection settings can also be used to successfully connect to device 10 using base station 80-2. In this way, second base station 80-2 may establish a connection without cycling through possible connection settings until a connection is successfully established or requesting optimal connection settings from an additional source, thereby reducing the time required to establish the secondary connection with secondary base station 80-2 relative to the time required to establish the primary connection between device 10 and primary base station 80-1. Steps 214-228 may be performed while the primary connection between device 10 and primary base station 80-1 is maintained (e.g., the secondary connection between device 10 and secondary base station 80-2 may be set up without dropping the primary connection between device 10 and primary base station 80-1.

If desired, the steps of FIG. 10 may be used to establish additional secondary connections with additional base stations 80. For example, device 10 may perform carrier aggregation to simultaneously send and receive signals with a primary component carrier station (e.g., base station 80-1) and two secondary component carrier stations. In this example, a single data stream may be divided into three parallel data streams that are conveyed between device 10 and each of the three base stations using different respective frequency bands. In general, any desired number of secondary base stations may be used in simultaneously communicating with device 10 in conjunction with primary base station 80-1.

Figure 11:
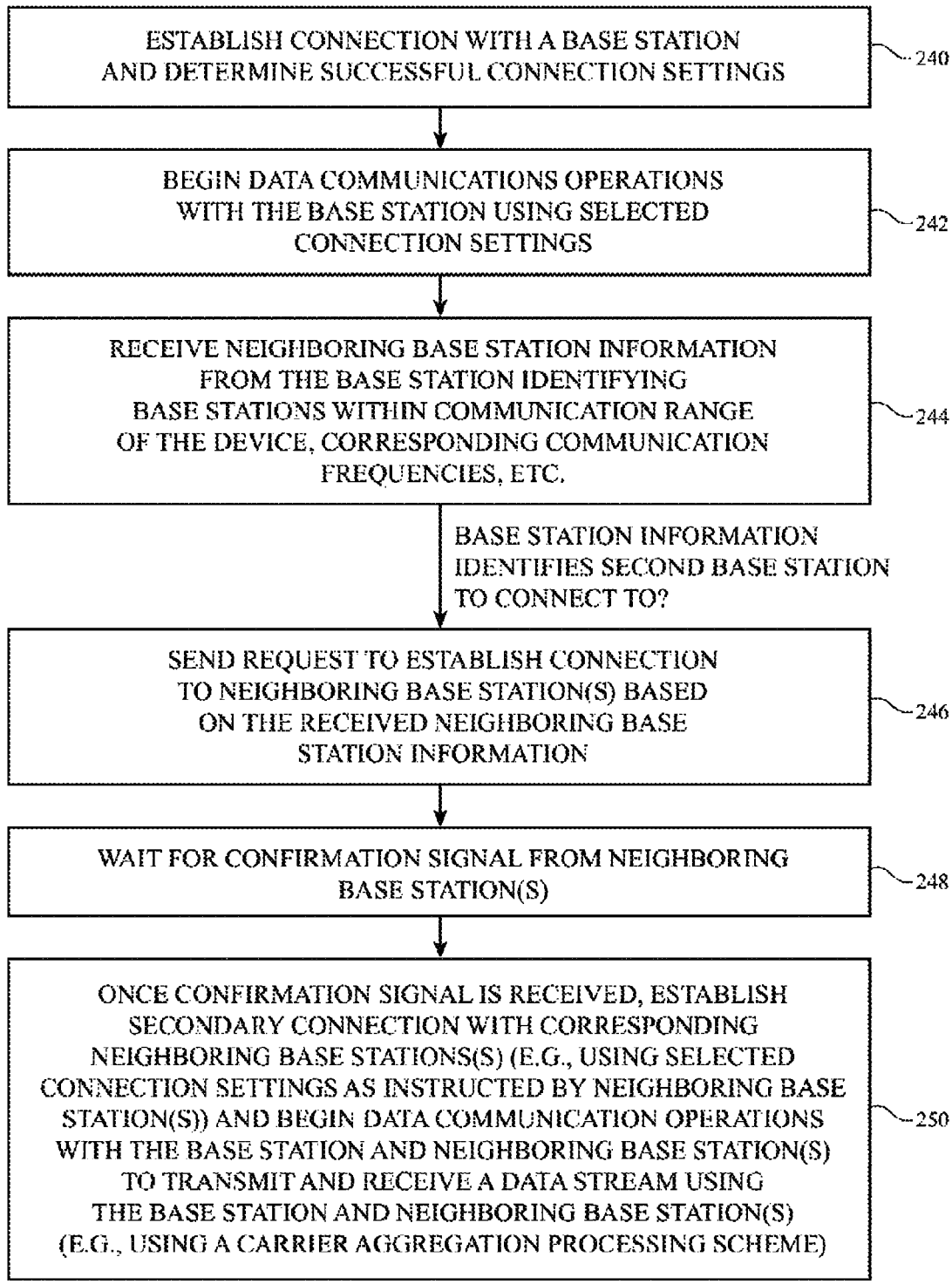
FIG. 11 is a flow chart of illustrative steps that may be performed by a wireless device to establish simultaneous wireless connections with multiple wireless base stations for sending and receiving wireless signals with the base stations in different frequency bands in accordance with an embodiment of the present invention.

FIG. 11 shows a flow chart of illustrative steps that may be performed by device 10 to establish a carrier aggregation connection with multiple base stations 80 in a cellular network such as network 180 of FIG. 8. The steps of FIG. 11 may, for example, be performed while processing step 202 of FIG. 9.

At step 240, device 10 may establish a connection with primary base station 80-1 using selected connection settings. As an example, device 10 may send a request to connect to base station 80-1 and may receive a response to the request from base station 80-1. Device 10 and/or base station 80-1 may determine successful connection settings with which a successful communications link is established between device 10 and base station 80-1. As an example, if a first set of connection settings between device 10 and base station 80-1 are unsuccessful at establishing an adequate wireless link, a second set of connection settings may be used to establish the link. Once a successful connection has been established, processing may proceed to step 242. Device 10 and/or base station 80-1 may store the successful connection settings with which device 10 established the connection with base station 80-1.

At step 242, device 10 may begin data communications operations with base station 80-1 using the selected connection settings. Device 10 may, for example, send normal communications data (e.g., cellular voice data and non-voice data), may send device identification information, or any other desired data to device 10. If desired, device 10 may wait until a successful carrier aggregation connection has been established with multiple base stations before sending normal communications data to base station 80-1.

At step 244, device 10 may receive neighboring base station information such as neighboring base station information 96 of FIG. 3 from base station 80-1. Device 10 may process the received base station information to determine whether to request a secondary connection with an additional base station 80 in network 180. If device 10 determines that the received base station information identifies a suitable base station 80 with which to establish a secondary connection (e.g., if the received base station information identifies a second base station such as base station 80-2 of FIG. 8 having a wireless coverage region that includes the location of device 10), processing may proceed to step 246. The received base station information may include, for example, a command issued by base station 80-1 for device 10 to establish a connection with additional base stations 80, information about which frequency band to use to establish the connection with additional base stations 80, etc. If desired, device 10 may determine not to perform carrier aggregation (e.g., if the data throughput on the device is satisfactory, etc.), in which case device 10 may subsequently perform normal communication operations with first base station 80-1.

At step 246, device 10 may send a request to establish a secondary connection to other base stations 80 in network 180 (e.g., base stations other than primary base station 80-1 to which device 10 is already connected) based on the neighboring base station information received from base station 80-1. For example, device 10 may configure wireless circuitry 34 for simultaneous communications in the frequency band associated with neighboring base station 80-2 and in the frequency band associated with primary base station 80-1 (e.g., by configuring switching circuitry 68, diplexer circuitry 64, and duplexer circuitry 66 to route signals between appropriate transmitters 48, receivers 50, and antennas 40). Device 10 may broadcast a request to establish a connection over a frequency band identified in the received neighboring base station information as corresponding to the coverage zone 172 of neighboring base station 80-2 in which device 10 is located. In another suitable arrangement, the received neighboring base station information may include a command issued by base station 80-1 that instructs device 10 to broadcast the request over an appropriate frequency band used by base station 80-2. By using the received neighboring base station information to broadcast requests to establish a secondary connection, device 10 may omit broadcasting requests over frequency bands that are not in use by neighboring base station 80-2, thereby reducing the amount of time required to establish the carrier aggregation connection.

At step 248, device 10 may wait for a confirmation from neighboring base station 80-2 that a secondary connection is to be established. Device 10 may maintain the primary connection with primary base station 80-1 while waiting for confirmation from neighboring base station 80-2 (e.g., the configuration of wireless circuitry 34 may allow simultaneous communications over primary and one or more secondary connections without dropping the primary connection). Once a confirmation is received from neighboring base station 80-2 that a secondary connection is to be established, processing may proceed to step 250.

At step 250, device 10 and base station 80-2 may establish a secondary connection. While establishing the secondary connection, device 10 may receive downlink signals from neighboring base station 80-2 that were transmitted using one or more of the selected connection settings with which the connection between first base station 80-1 and device 10 was established. Base station 80-2 may send control signals to device 10 to instruct device 10 to transmit uplink signals using one or more of the selected connection settings with which the connection between first base station 80-1 and device 10 was established. In this way, a satisfactory wireless connection may be established between neighboring base station 80-2 and device 10 in less time than in scenarios where base station 80-2 is unaware of the connection settings used in establishing the primary connection between device 10 and primary base station 80-1. Device 10 may subsequently begin normal data communications operations using carrier aggregation between primary base station 80-1 and secondary base station 80-2 to provide device 10 with improved data throughput relative to communications schemes in which only a single frequency band is used.

FIG. 12 shows a table 398 of connection settings that may be used in establishing the primary connection between device 10 and first base station 80-1 and in establishing the secondary connection between device 10 and second base station 80-2. The information in table 398 of FIG. 12 may, for example, be stored as a portion of device information 94 on first base station 80-1, and may therefore sometimes be referred to herein as device connection settings 398 or device connection information 398. First base station 80-1 may generate and store device connection information 398 once a successful connection has been established with device 10 (e.g., after processing step 212 of FIG. 8) and may broadcast connection information 398 to neighboring base stations 80 in network 180 (e.g., while processing step 214 of FIG. 8).

Each entry (row) of connection information 398 may correspond to a connection setting used by base station 80-1 and/or device 10 to successfully establish the primary connection between the base station and the device. Entries in connection information 398 may include connection settings associated with the generation and transmission of uplink signals such as uplink connection settings 404 and may include connection settings associated with the generation and transmission of downlink signals such as downlink connection settings 406. Device 10 may, for example, use one or more of connection settings 404 to transmit uplink signals to base stations 80. Base stations 80 may, for example, use one or more of connection settings 406 to transmit downlink signals to device 10. If desired, primary base station 80-1 and/or secondary base station 80-2 may instruct device 10 to transmit secondary signals to base station 80-2 (e.g., to establish a secondary connection) using settings 404 or device 10 may transmit secondary signals to secondary base station 80-2 based on predetermined uplink connection settings stored on storage and processing circuitry 28 that are already in use between device 10 and primary base station 80-1. Secondary base station 80-2 may clone (copy) one or more entries of device connection settings 398 when establishing the secondary connection between device 10 and base station 80-2 (e.g., while processing step 228 of FIG. 10).

Column 400 of table 398 includes connection settings associated with the established connection between device 10 and base station 80-1. Column 402 includes examples of values corresponding to each connection setting in column 400. In the example of FIG. 12, uplink connection settings 404 include the number of resource blocks 300 used by device 10 to transmit uplink signals to base stations 80 (e.g., device 10 may transmit uplink signals using 25 resource blocks 300), the starting resource block in the corresponding channel 304 to use for transmitting the uplink signals (e.g., device 10 may transmit the uplink signals using 25 resource blocks 300 beginning with the first resource block in the channel), the modulation scheme with which the uplink signals are generated (e.g., device 10 may modulate the uplink signals using a QPSK modulation scheme), the uplink data rate to use when generating the uplink signals (e.g., device 10 may generate the uplink signals having an uplink data rate A), the uplink power level provided by power amplifier 72 (e.g., power amplifiers 72 may provide uplink signals at a power level B), a path loss compensation value to be added to the uplink signals (e.g., a path loss compensation value E may be added to the uplink signals by device 10 and/or base stations 80), and a channel bandwidth to use for generating the uplink signals (e.g., device 10 may generate the uplink signals having channel bandwidth F). This example is merely illustrative. In general, any desired uplink connection settings 404 may be stored and used for transmitting uplink signals (e.g., settings 404 may include the particular deployment of resource blocks 300 to use, the frequency channel of a particular LTE band to use, etc.). Device 10 may use uplink settings 404 to configure baseband circuitry 54, amplifier circuitry 72, front end circuitry 60, antennas 40, and/or transceivers 90 to generate corresponding uplink signals that are to be transmitted to base stations 80-1 and 80-2 using a carrier aggregation communications scheme (e.g., over a carrier aggregation link).

In the example of FIG. 12, downlink connection settings 406 include the number of downlink resource blocks 300 used by base stations 80 to transmit downlink signals to device 10, the starting resource block for transmitting the downlink signals, the modulation scheme used to generate the downlink signals, the downlink data rate, downlink power level, downlink power offset level, downlink channel bandwidth, etc. This example is merely illustrative. In general, any desired downlink connection settings 406 may be stored and used for transmitting downlink signals. Base stations 80 may use downlink settings 406 to configure corresponding wireless circuitry to generate and transmit the desired downlink signals to device 10. If desired, device 10 may use downlink settings 406 to configure baseband circuitry 54, amplifier circuitry 74, front end circuitry 60, antennas 40, and/or transceivers 90 for preparing to receive and process corresponding downlink signals from base stations 80.

Second base station 80-2 may use any desired number of device connection settings 398 to establish the secondary connection between base station 80-2 and device 10. In one suitable arrangement, secondary base station 80-2 may clone all of the connection settings in table 398 for establishing the secondary connection. However, in some scenarios, such as when device 10 is located at different distances with respect to base station 80-1 and base station 80-2, some connection settings 398 such as uplink and downlink power level may be omitted from cloning at secondary base station 80-2 (e.g., because the path loss between base stations 80-1, 80-2 and device 10 would be different in such a scenario). In this scenario, base station 80-2 may determine power levels to use in establishing the secondary connection using any desired algorithm (e.g., by cycling through different power levels, etc.). In general, any desired number of connection settings 398 may be cloned at secondary base station 80-2 for establishing the secondary connection with device 10. As settings 398 were previously used to establish a successful connection between device 10 and primary base station 80-1, second base station 80-2 may establish a successful secondary connection with device 10 using one or more of the same connection settings, thereby reducing the amount of time required to establish the secondary connection. In this way, base stations 80 and device 10 may rapidly set up and begin high-throughput carrier aggregation operations between base stations 80 and device 10.

If desired, base stations 80 and device 10 may be operable in a test mode of operation for performing wireless test operations or in a normal mode of operation. In the test mode of operation, device 10 may send wireless test data to base stations 80 and/or may receive wireless test data from base stations 80. If desired, device 10 may receive voice data from base stations 80 in addition to or instead of test data from base stations 80 during the test mode. During the normal mode of operation, device 10 may receive data traffic and/or voice data from base stations 80 (e.g., based on the configuration of base stations 80). For example, software or test circuitry on base stations 80 and device 10 may perform wireless testing operations on the network, device, and/or base stations when enabled. The test circuitry or software may be enabled autonomously (e.g., at a predetermined interval) and/or when selected by a user of the base station (e.g., when a network operator chooses to perform testing) or a user of the device (e.g., when an end user of the device chooses to perform testing). If desired, device connection settings may be cloned between base stations only when device 10 is operated in the test mode, only when operated in the normal communications mode, and/or in both the test mode and the normal communications mode.

The foregoing is merely illustrative of the principles of this invention and various modifications can be made by those skilled in the art without departing from the scope and spirit of the invention. The foregoing embodiments may be implemented individually or in any combination.

What is claimed is:

1. A method of operating a wireless system having first and second base stations for wirelessly communicating with an electronic device, the method comprising:
   with the first base station, establishing a first wireless connection between the first base station and the electronic device using a set of wireless connection settings;
   with the first base station, transmitting the set of wireless connection settings to the second base station, wherein the transmitted set of wireless connection settings comprises a selected resource block allocation and establishing the first wireless connection comprises establishing the first wireless connection between the first base station and the electronic device using the selected resource block allocation; and
   with the second base station, establishing a second wireless connection between the second base station and the electronic device based on the set of wireless connection settings while the first base station simultaneously maintains the first wireless connection with the electronic device, wherein establishing the second wireless connection comprises establishing the second wireless connection between the second base station and the electronic device using the selected resource block allocation of the wireless connection settings received from the first base station.

2. The method defined in claim 1, further comprising:
   with the first and second base stations, simultaneously transmitting first and second data streams to the electronic device over respective first and second frequency bands, wherein the second frequency band is different from the first frequency band.

3. The method defined in claim 2, wherein the first base station comprises storage circuitry, the method further comprising:
   with the first base station, storing neighboring base station information on the storage circuitry that identifies the second base station and the second frequency band; and
   with the first base station, transmitting the stored neighboring base station information to the electronic device over the first frequency band.

4. The method defined in claim 2, further comprising:
   with the first base station, receiving device identification information from the electronic device over the first frequency band and transmitting the received device identification information to the second base station.

5. The method defined in claim 4, further comprising:
   with the second base station, receiving a request to establish the second wireless connection from the electronic device over the second frequency band; and
   with the second base station, retrieving additional device identification information from the electronic device over the second frequency band in response to receiving the request to establish the second wireless connection.

6. The method defined in claim 5, further comprising:
   with the second base station, determining whether to establish the second wireless connection between the second base station and the electronic device by comparing the device identification information received from the first base station to the additional device identification information received from the electronic device; and
   with the second base station, establishing the second wireless connection in response to determining that the device identification information received form the first base station matches the additional device identification information received from the electronic device.

7. The method defined in claim 2, wherein establishing the second wireless connection between the second base station and the electronic device comprises:
   establishing the second wireless connection with the electronic device without dropping the first wireless connection between the first base station and the electronic device.

8. The method defined in claim 2, wherein the selected resource block allocation comprises a Long-Term-Evolution (LTE) protocol resource block allocation.

9. The method defined in claim 2, wherein establishing the second wireless connection between the second base station and the electronic device based on the received set of wireless connection settings comprises:
   copying at least one of the received wireless connection settings used by the first base station to establish the first wireless connection at the second base station; and
   transmitting radio-frequency downlink signals to the electronic device over the second frequency band using the copied wireless connection settings.

10. The method defined in claim 9, wherein the copied wireless connection settings include at least one of: a downlink power level setting, a modulation scheme setting, and a bandwidth setting.

11. The method defined in claim 2, wherein simultaneously transmitting the first and second data streams to the electronic device over the respective first and second frequency bands comprises transmitting the first and second data streams to the electronic device over Long-Term-Evolution band 17 and Long-Term-Evolution band 4, respectively.

12. The method defined in claim 1, wherein establishing the second wireless connection between the second base station and the electronic device based on the received set of wireless connection settings comprises establishing the second wireless connection using a subset of the set of wireless connection settings.

13. The method defined in claim 1, wherein establishing the second wireless connection between the second base station and the electronic device based on the received set of wireless connection settings comprises establishing the second wireless connection using all of the wireless connection settings in the received set of wireless connection settings.

14. The method defined in claim 1, further comprising:
with the first base station, transmitting the set of wireless connection settings to a third base station; and
with the third base station, establishing a third wireless connection between the third base station and the electronic device based on the set of wireless connection settings while the first base station simultaneously maintains the first wireless connection and the second base station simultaneously maintains the second wireless connection with the electronic device.

15. A method of receiving radio-frequency transmissions under a carrier aggregation scheme using wireless communications circuitry, the method comprising:
with the wireless communications circuitry, establishing a first wireless connection with a first wireless base station using selected connection settings;
with the wireless communications circuitry, receiving neighboring base station information from the first base station that identifies a second base station, wherein the neighboring base station information comprises a first wireless coverage area associated with the first base station and a second wireless coverage area associated with the second base station;
with the wireless communications circuitry, determining whether the wireless communications circuitry is located within an overlap region between the first wireless coverage area and the second wireless coverage area; and
in response to determining that the wireless communications circuitry is located in the overlap region between the first wireless coverage area and the second wireless coverage area, with the wireless communications circuitry, transmitting a request to establish a second wireless connection with the second wireless base station based on the received neighboring base station information while maintaining the first connection with the first base station.

16. The method defined in claim 15, further comprising:
with the wireless communications circuitry, establishing the second wireless connection with the second wireless base station using at least some of the selected connection settings without dropping the first connection with the first base station.

17. The method defined in claim 16, further comprising:
with the wireless communications circuitry, receiving a first data stream from the first base station over the first wireless connection in a first frequency band and simultaneously receiving a second data stream from the second base station over the second wireless connection in a second frequency band that is different from the first frequency band; and
with baseband circuitry in the wireless communications circuitry, combining the first and second data streams into a single data stream.

18. The method defined in claim 17, wherein receiving the neighboring base station information from the first base station comprises receiving the neighboring base station information over the first frequency band, wherein the received neighboring base station information identifies that the second frequency band is in use by the second base station, and wherein transmitting the request to establish the second wireless connection based on the received neighboring base station information comprises transmitting the request to the second base station over the second frequency band.

19. A wireless communications system for communicating with wireless communications circuitry, comprising:
a first base station, wherein the first base station is configured to establish a primary wireless connection with the wireless communications circuitry in a first frequency band using selected connection settings, wherein the selected connection settings comprise a selected resource block allocation; and
a second base station, wherein the second base station is configured to receive the selected connection settings from the first base station and to establish a secondary wireless connection with the wireless communications circuitry in a second frequency band that is different from the first frequency band using the selected resource block allocation of the selected connection settings received from the first base station while the first base station maintains the primary wireless connection.

20. The wireless communications system defined in claim 19, wherein the selected connection settings comprise a selected modulation scheme setting and the selected resource block allocation comprises a Long-Term-Evolution resource block allocation.

21. The wireless communications system defined in claim 20, wherein the first base station is configured to transmit a first portion of a data signal to the wireless communications circuitry over the first frequency band and the second base station is configured to simultaneously transmit a second portion of the data signal to the wireless communications circuitry over the second frequency band after the primary and secondary wireless connections have been established.

* * * * *